US010184832B2

(12) United States Patent
Shibayama et al.

(10) Patent No.: US 10,184,832 B2
(45) Date of Patent: Jan. 22, 2019

(54) LIGHT-DETECTING DEVICE

(71) Applicant: HAMAMATSU PHOTONICS K.K., Hamamatsu-shi, Shizuoka (JP)

(72) Inventors: Katsumi Shibayama, Hamamatsu (JP); Takashi Kasahara, Hamamatsu (JP); Masaki Hirose, Hamamatsu (JP); Toshimitsu Kawai, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/031,786

(22) PCT Filed: Oct. 31, 2014

(86) PCT No.: PCT/JP2014/079129
§ 371 (c)(1),
(2) Date: Apr. 25, 2016

(87) PCT Pub. No.: WO2015/064758
PCT Pub. Date: May 7, 2015

(65) Prior Publication Data
US 2016/0245697 A1 Aug. 25, 2016

(30) Foreign Application Priority Data
Oct. 31, 2013 (JP) ................. 2013-227286

(51) Int. Cl.
*G01J 3/26* (2006.01)
*G01J 3/02* (2006.01)
*G01J 3/45* (2006.01)
(52) U.S. Cl.
CPC .............. *G01J 3/26* (2013.01); *G01J 3/0286* (2013.01); *G01J 3/45* (2013.01)
(58) Field of Classification Search
CPC ....................................................... G01J 3/26
(Continued)

(56) References Cited

U.S. PATENT DOCUMENTS

2003/0012230 A1 1/2003 Hopkins et al.
2003/0132386 A1* 7/2003 Carr .................... G01J 3/26
250/338.1
(Continued)

FOREIGN PATENT DOCUMENTS

CN 102449447 5/2012
EP 1 882 917 1/2008
(Continued)

OTHER PUBLICATIONS

International Preliminary Report on Patentability dated May 12, 2016 for PCT/JP2014/079103.
(Continued)

*Primary Examiner* — Tarifur Chowdhury
*Assistant Examiner* — Omar Nixon
(74) *Attorney, Agent, or Firm* — Drinker Biddle & Reath LLP

(57) ABSTRACT

A spectral sensor includes a Fabry-Perot interference filter which is provided with an opening to pass light transmitted according to a distance between a first mirror and a second mirror along a facing direction; a light detector which has a light reception unit to receive the light having passed through the opening; a wiring substrate on which the light detector is mounted; and a plurality of spacers which support the filter on the wiring substrate, such that a second space continuous with a first space in the opening and including the first space when viewed from the facing direction is formed between the filter and the wiring substrate. The light detector is disposed in the second space. The light reception unit is disposed in a region corresponding to the first space in the second space, when viewed from the facing direction.

7 Claims, 25 Drawing Sheets

(58) Field of Classification Search
USPC .......................................................... 356/454
See application file for complete search history.

(56) References Cited

U.S. PATENT DOCUMENTS

| | | |
|---|---|---|
| 2003/0193983 A1 | 10/2003 | Cheng et al. |
| 2003/0219056 A1 | 11/2003 | Yager et al. |
| 2003/0222218 A1 | 12/2003 | Nozu |
| 2005/0276303 A1 | 12/2005 | huang |
| 2005/0276306 A1 | 12/2005 | Mick et al. |
| 2006/0055308 A1 | 3/2006 | Lairson et al. |
| 2007/0099001 A1 | 5/2007 | Melchior |
| 2007/0230855 A1 | 10/2007 | McDonald et al. |
| 2009/0040616 A1* | 2/2009 | Lin .................. G01J 3/02 359/579 |
| 2010/0022840 A1* | 1/2010 | Yasuda ............... A61B 1/04 600/160 |
| 2010/0296164 A1* | 11/2010 | Yasuda ............ A61B 1/0008 359/579 |
| 2012/0068609 A1 | 3/2012 | Ide et al. |
| 2012/0109584 A1* | 5/2012 | Urushidani ........ G01J 3/027 702/189 |
| 2013/0075596 A1 | 3/2013 | Matsuno et al. |

FOREIGN PATENT DOCUMENTS

| | | |
|---|---|---|
| JP | H07-66982 B2 | 7/1995 |
| JP | H10-90576 A | 4/1998 |
| JP | H10-511772 A | 11/1998 |
| JP | 2001-235369 A | 8/2001 |
| JP | 2003-344156 A | 12/2003 |
| JP | 2005-106753 A | 4/2005 |
| JP | 2009-210312 A | 9/2009 |
| JP | 2011-117884 | 6/2011 |
| JP | 2012-127862 A | 7/2012 |
| JP | 2012-127917 A | 7/2012 |
| JP | 2012-173347 A | 9/2012 |

OTHER PUBLICATIONS

International Preliminary Report on Patentability dated May 12, 2016 for PCT/JP2014/079129.
Norbert Neumann et al., "Tunable infrared detector with integrated micromachined Fabry-Perot filter", Journal of Microlithography, Microfabrication and Microsys, Society of Photo-Optical Instrumentation Engineers, Bellingham, US, vol. 7, No. 2, ISSN: 1537-1646, DOI:10.1117/1.2909206, Apr. 1, 2008, p. 21004-1, XP007922298.
Norbert Neumann et al., "Fig. 10 of Tunable infrared detector with integrated micromachined Fabry-Perot Filter", J. Micro/Nanolith. MEMS MOEMS, Jun. 1, 2008, p. 21004-1, XP055394641.
Antila J, "Miniaturized spectrometer technologies", Information Optics(WI0), 2010 9th Euro-American Workshop on, IEEE, Piscataway, NJ, USA, ISBN:978-1-4244-8226-9, Jul. 12, 2010, p. 1-p. 4, XP031760871.

* cited by examiner

Fig.7
(A)
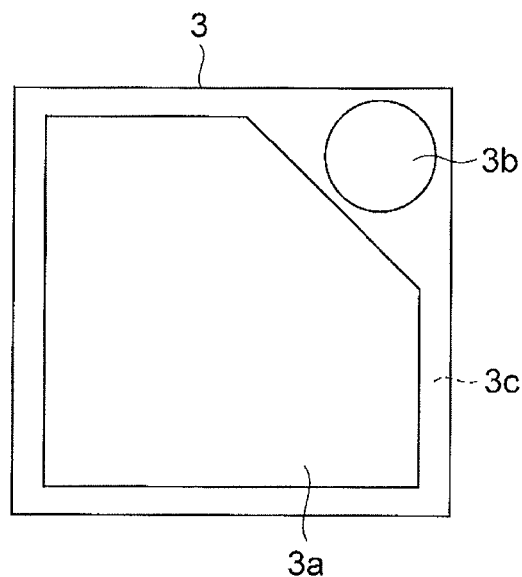
(B)
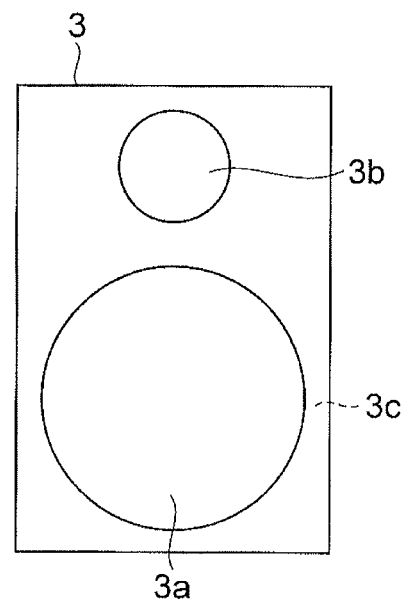

*Fig.8*
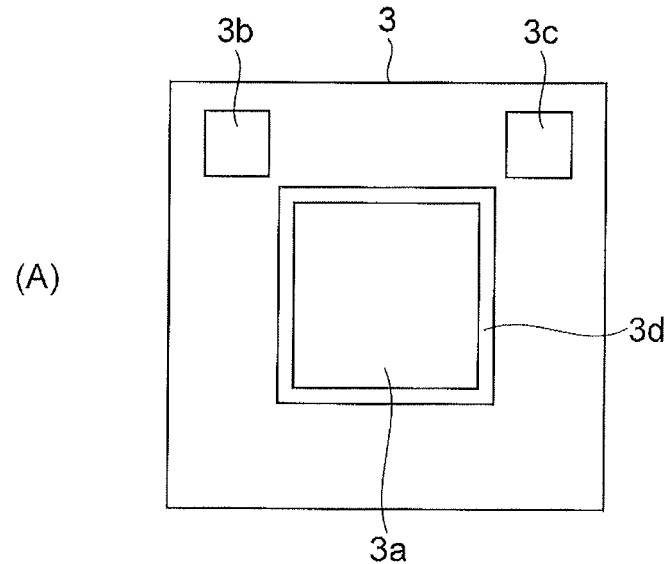
(A)
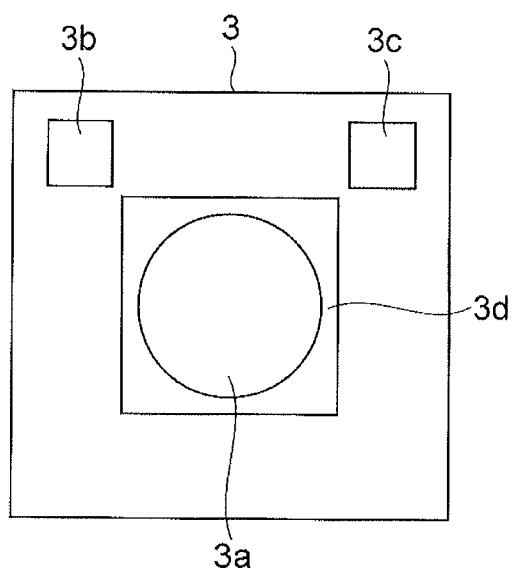
(B)

Fig.9
(A) 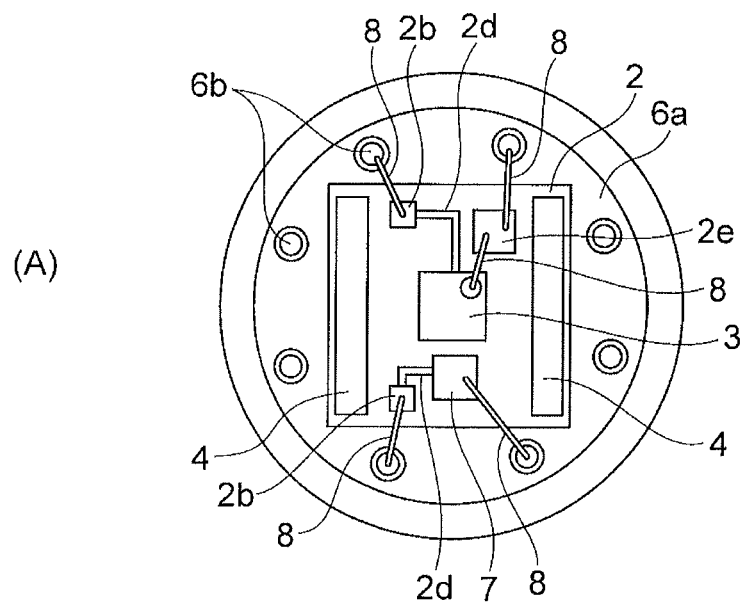
(B) 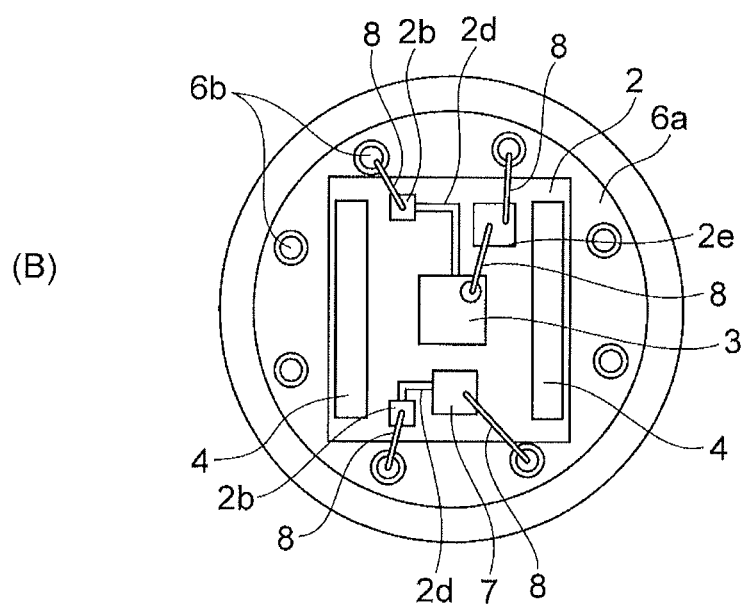

Fig.12
(A)
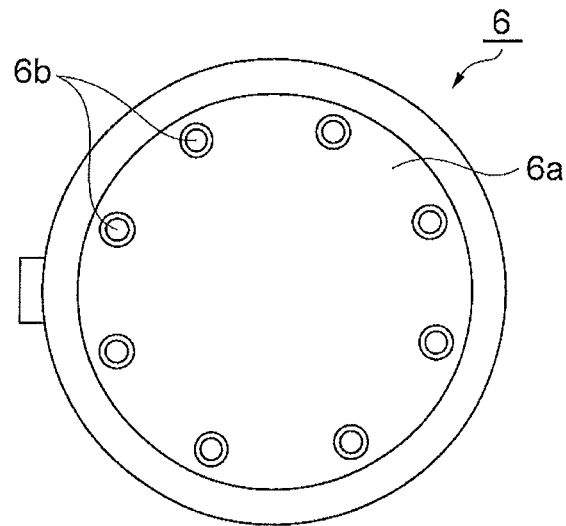
(B)
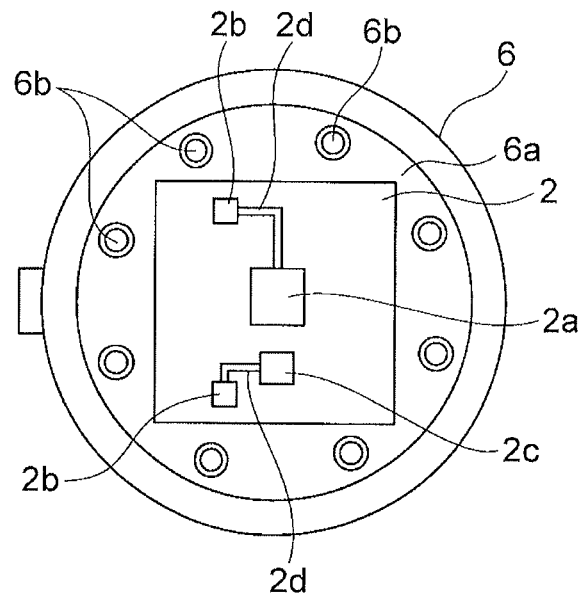

Fig.13
(A)
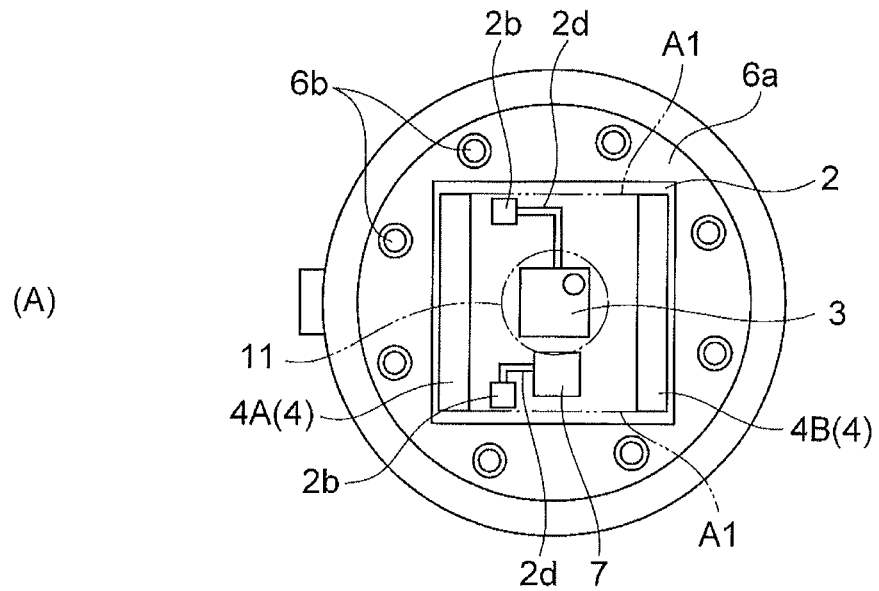
(B)
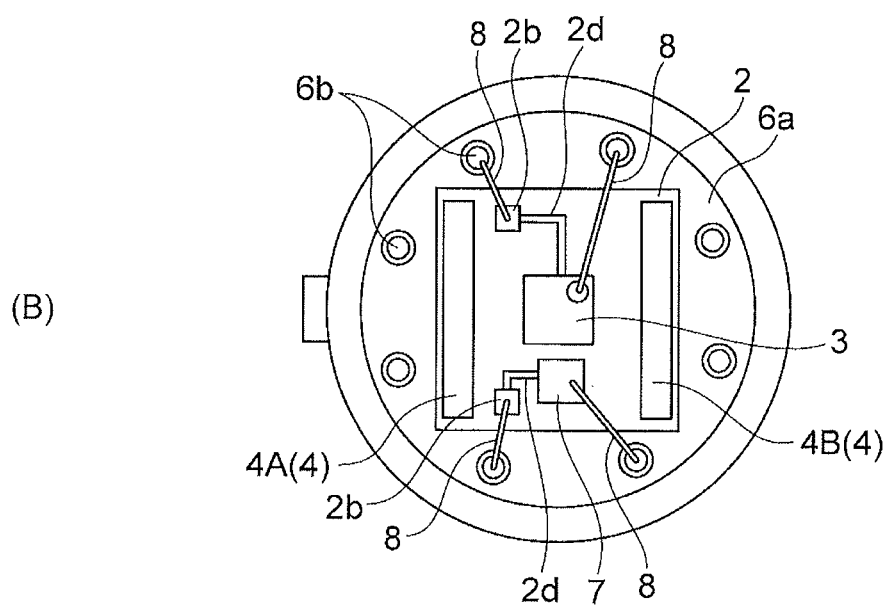

*Fig.14*
(A)
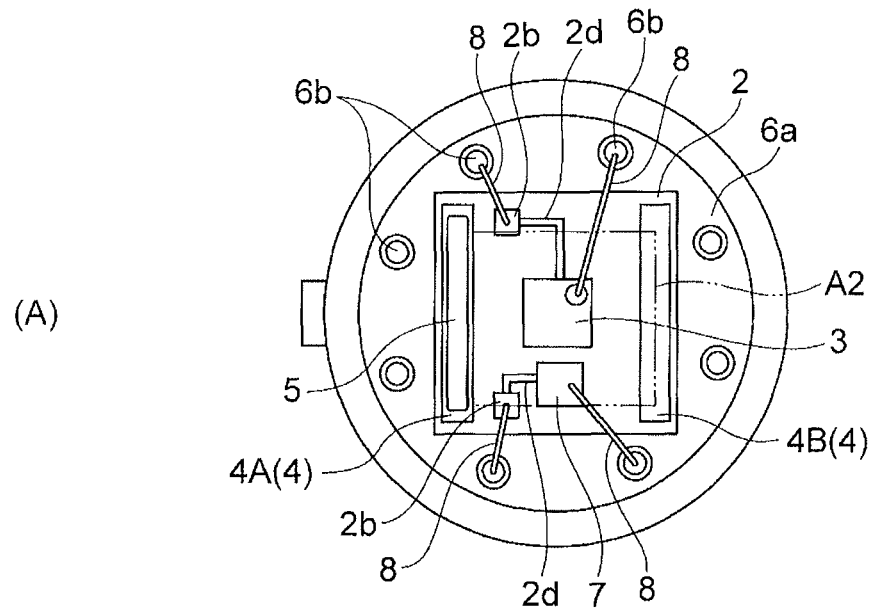
(B)
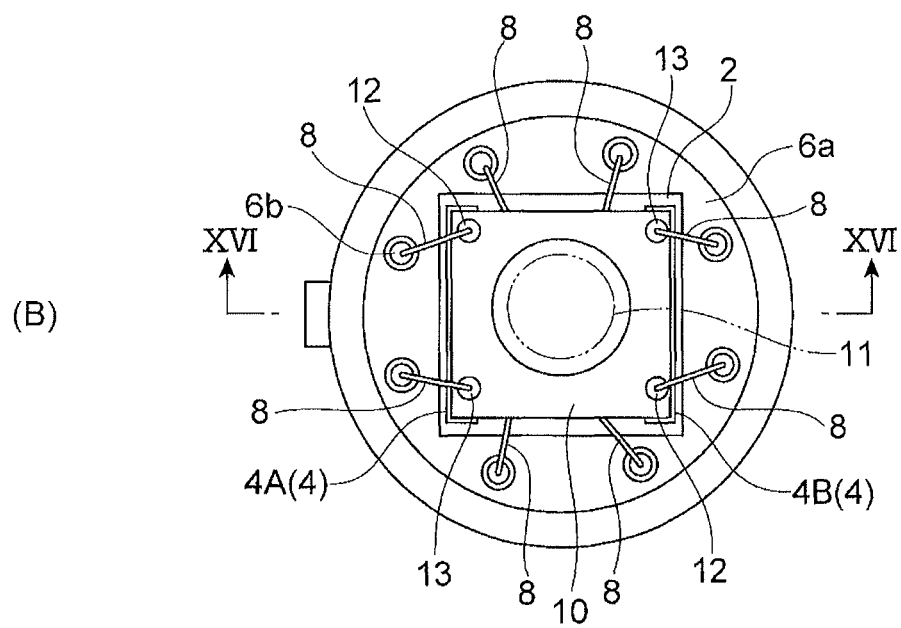

Fig.18
(A) 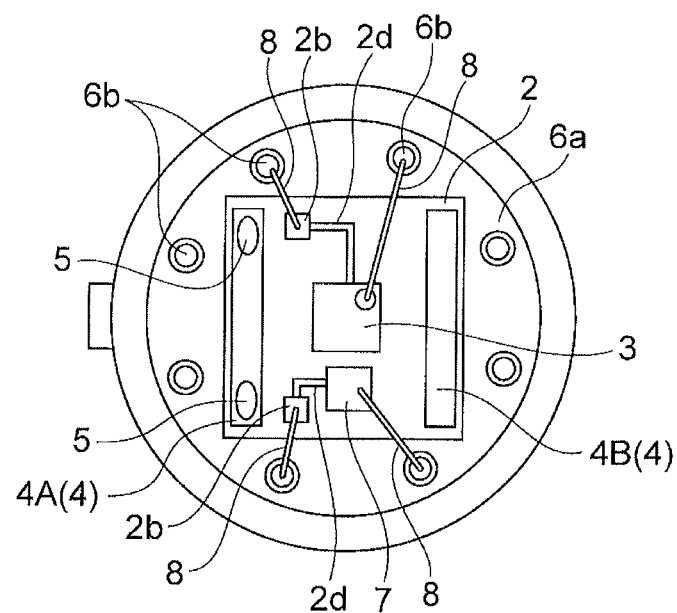
(B) 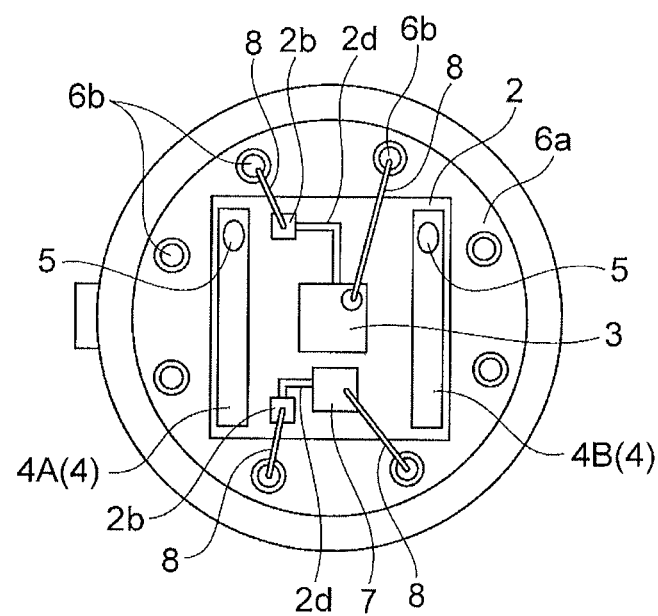

Fig.19
(A)
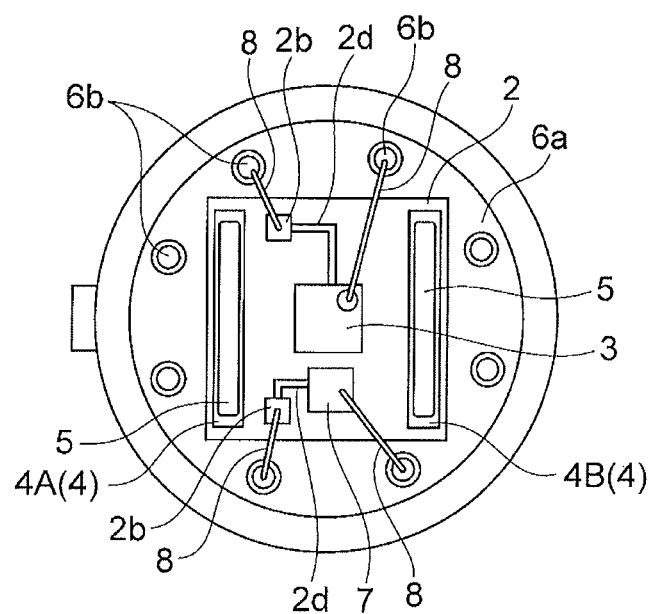
(B)
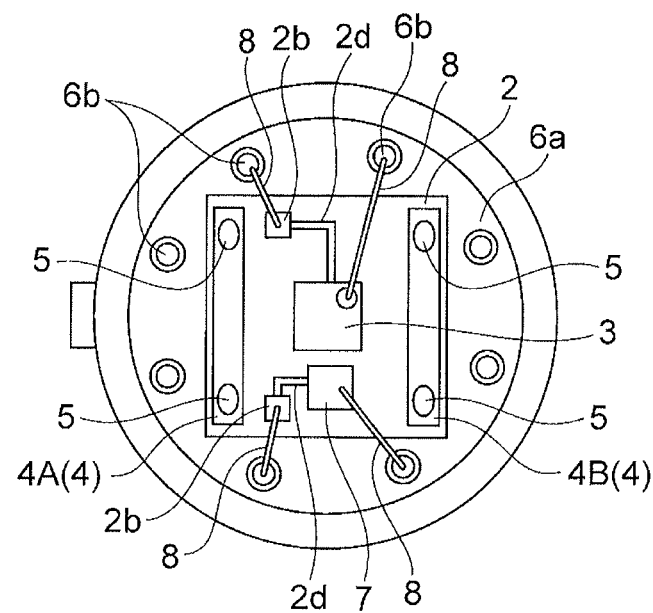

Fig.20
(A)
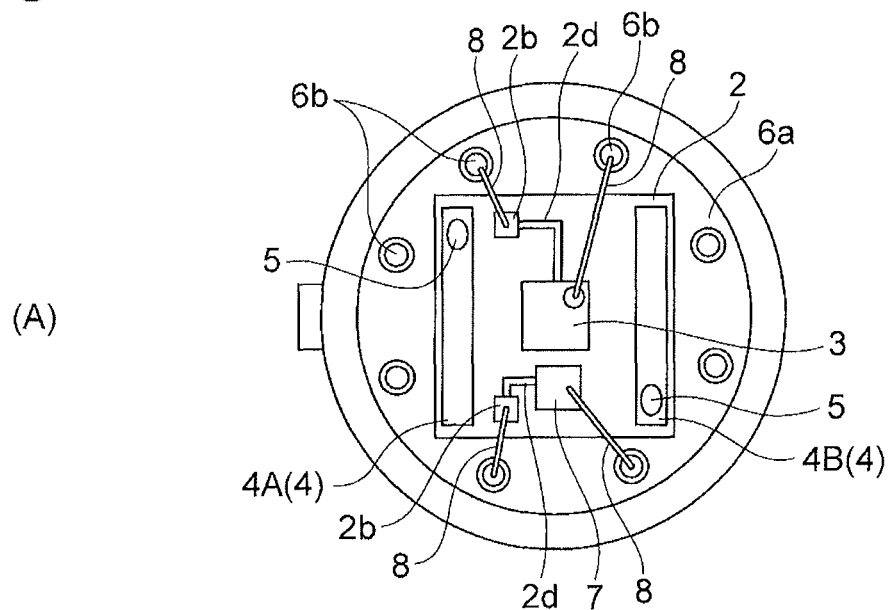
(B)
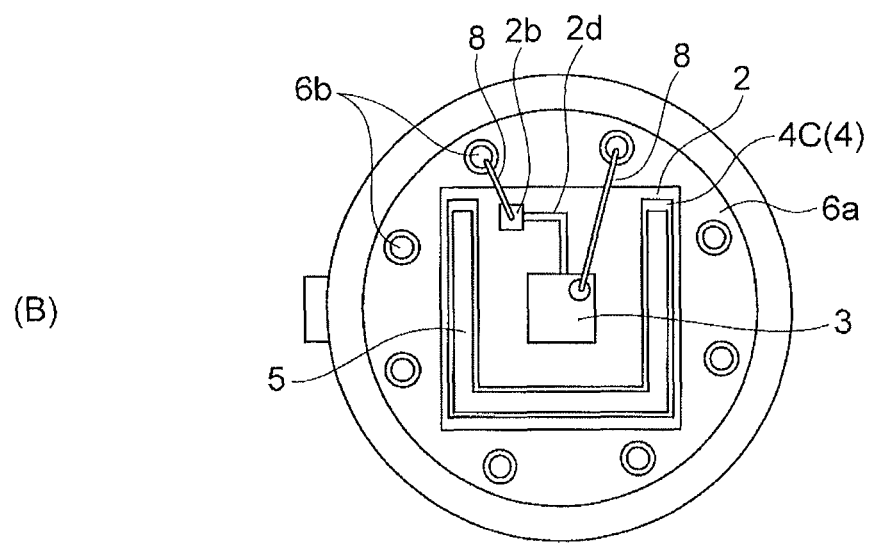

Fig.21
(A)
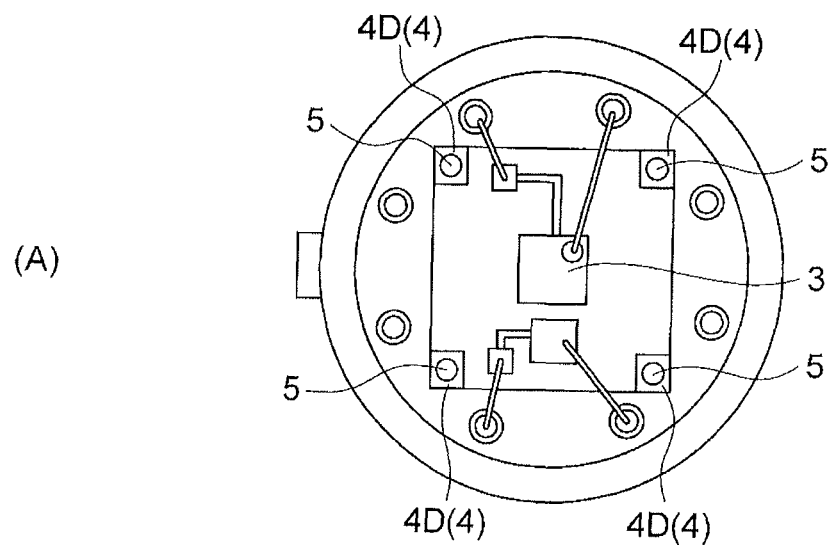
(B)
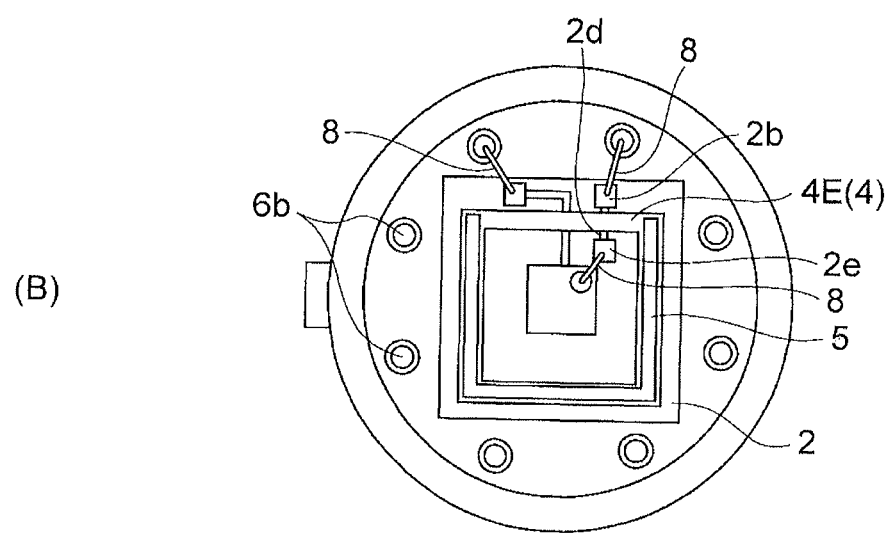

Fig.24
(A)
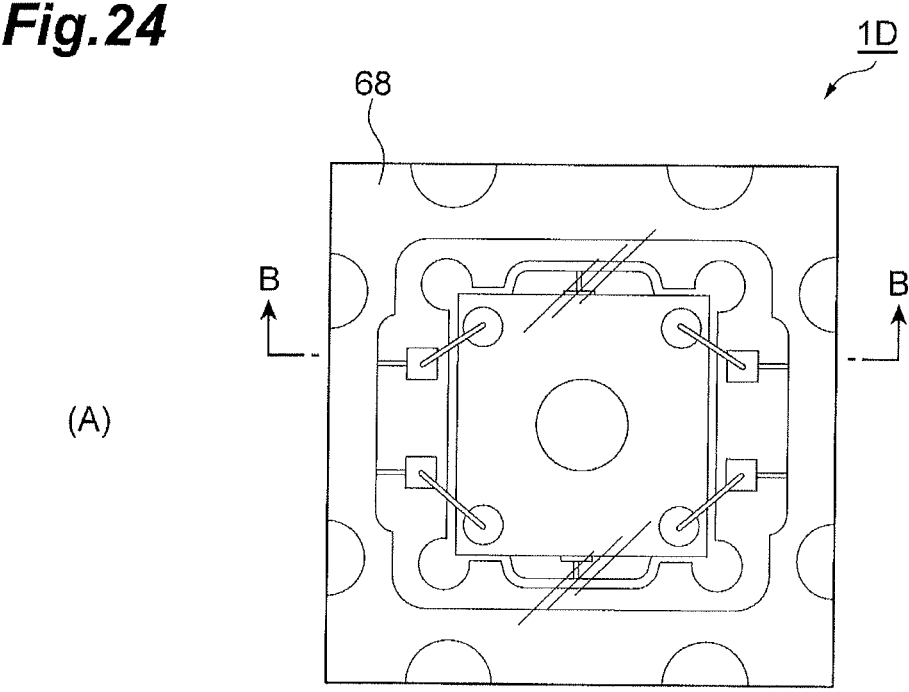
(B)
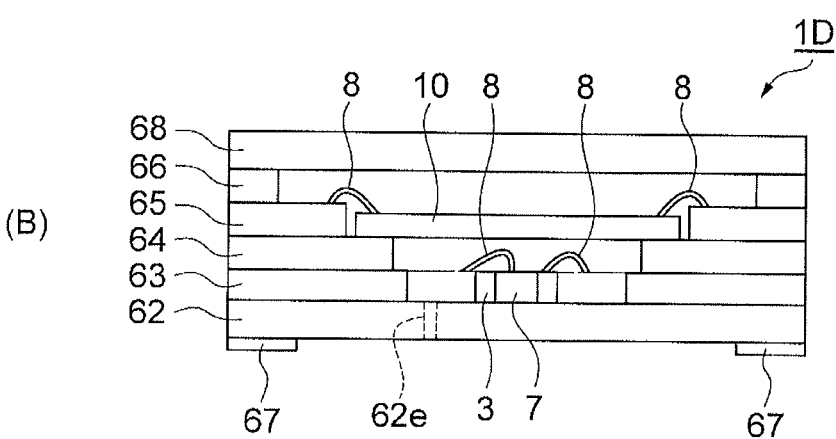

Fig.25
(A)
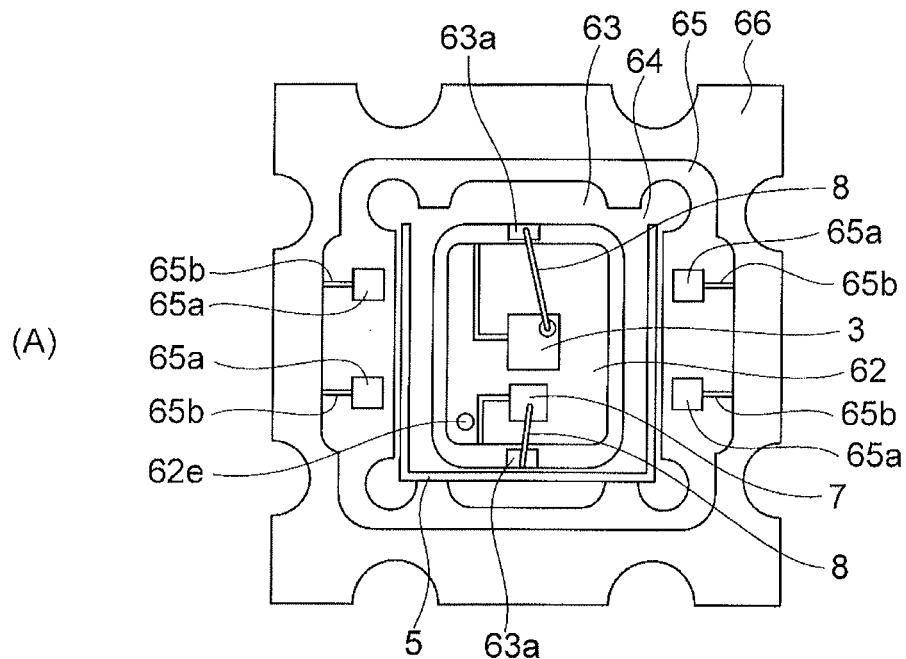
(B)
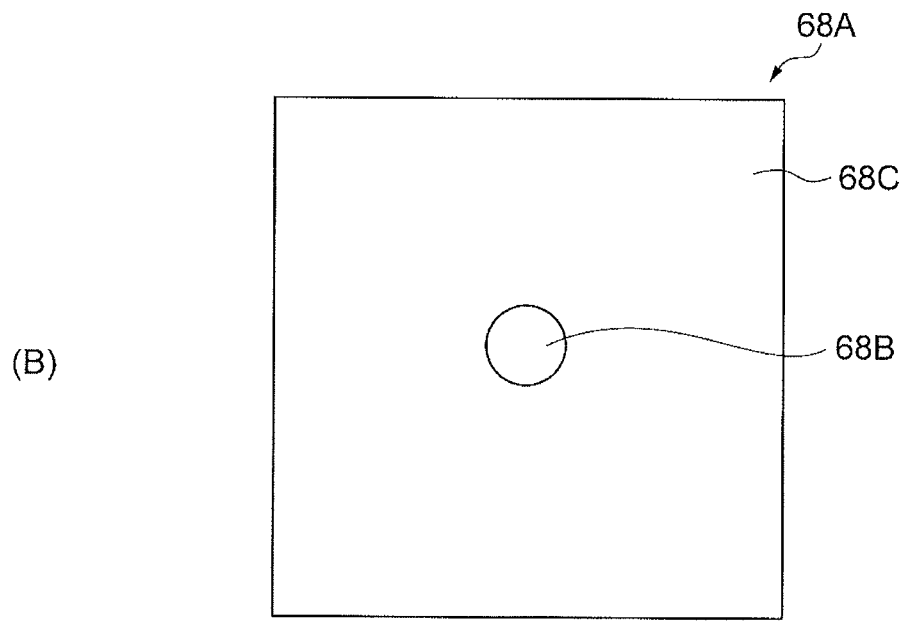

LIGHT-DETECTING DEVICE

TECHNICAL FIELD

The present invention relates to a light-detecting device that includes a Fabry-Perot interference filter.

BACKGROUND ART

A light-detecting device that includes a Fabry-Perot interference filter having a first mirror and a second mirror with variable distances and a light detector to detect light having transmitted the Fabry-Perot interference filter is known (for example, refer to PTL 1).

CITATION LIST

Patent Literature

PTL 1: JP-A-2005-106753

SUMMARY OF INVENTION

Technical Problem

In the light-detecting device described above, improvement of wavelength resolution, suppression of wavelength shift, and improvement of a spectral characteristic are required regarding transmission of the light in the Fabry-Perot interference filter and detection of the light in the light detector.

Accordingly, an object of the present invention is to provide a light-detecting device that can realize improvement of wavelength resolution, suppression of wavelength shift, and improvement of a spectral characteristic.

Solution to Problem

A light-detecting device according to an embodiment of the present invention includes: a Fabry-Perot interference filter having a first mirror and a second mirror and is provided with an opening to pass light transmitted according to a distance between the first mirror and the second mirror along a predetermined direction, the distance between the first mirror and the second mirror being variable; a light detector which has a light reception unit to receive the light having passed through the opening; a wiring substrate, the light detector being mounted on the wiring substrate; and a support member supporting the Fabry-Perot interference filter on the wiring substrate, such that a second space is formed between the Fabry-Perot interference filter and the wiring substrate, the second space being continuous with a first space in the opening and including the first space when viewed from the predetermined direction, wherein the light detector is disposed in the second space, and the light reception unit is disposed in a region corresponding to the first space in the second space, when viewed from the predetermined direction.

In the light-detecting device, the light reception unit of the light detector is disposed in the region corresponding to the first space in the opening provided in the Fabry-Perot interference filter, in the second space formed between the Fabry-Perot interference filter and the wiring substrate. For this reason, light having transmitted a region paralleled in the first mirror and the second mirror becomes easy to arrive at the light reception unit of the light detector. As a result, wavelength resolution can be improved. In addition, the light reception unit of the light detector is disposed in the second space that is continuous with the first space. For this reason, distances from the first mirror and the second mirror to the light reception unit of the light detector increase and light incident on the Fabry-Perot interference filter at a small incidence angle becomes easy to arrive at the light reception unit of the light detector. As a result, the wavelength resolution can be improved and wavelength shift can be suppressed. In addition, the light detector is disposed in the second space formed between the Fabry-Perot interference filter and the wiring substrate. For this reason, stray light other than the light having transmitted the first mirror and the second mirror and having passed through the opening becomes hard to arrive at the light reception unit of the light detector. As a result, the stray light is reduced, so that a spectral characteristic can be improved.

In the light-detecting device according to another embodiment of the present invention, the light detector may be disposed in a region corresponding to the first space in the second space, when viewed from the predetermined direction. According to this, a cost of the light-detecting device can be decreased by miniaturizing the light detector. In addition, a temperature compensation element such as a thermistor can be disposed in the second space formed between the Fabry-Perot interference filter and the wiring substrate and the light-detecting device can be miniaturized even when a mounting component such as the temperature compensation element is added.

The light-detecting device according to another embodiment of the present invention may further include a mounting component mounted on the wiring substrate in the second space and the mounting component may be disposed outside the region corresponding to the first space in the second space, when viewed from the predetermined direction. According to this, reflection of the light in the mounting component can be suppressed and the stray light is reduced, so that a spectral characteristic can be further improved.

The light-detecting device according to another embodiment of the present invention may further include a package accommodating the Fabry-Perot interference filter, the light detector, the wiring substrate, and the support member and has a light incidence unit to cause light to be incident on the Fabry-Perot interference filter from the outside and the light incidence unit may be included in the Fabry-Perot interference filter when viewed from the predetermined direction. According to this, light incident into an inner portion of the package from the light incidence unit can be suppressed from being incident on the light reception unit of the light detector from a surrounding portion of the Fabry-Perot interference filter and the stray light is reduced, so that a spectral characteristic can be further improved.

Advantageous Effects of Invention

According to the present invention, a light-detecting device that can realize improvement of wavelength resolution, suppression of wavelength shift, and improvement of a spectral characteristic can be provided.

BRIEF DESCRIPTION OF DRAWINGS

FIG. 7 is a plan view of a modification of the light detectors of the spectral sensors of FIGS. 1 and 6.

FIG. 8 is a plan view of a modification of the light detectors of the spectral sensors of FIGS. 1 and 6.

FIG. 9 is a plan view of a modification of the spectral sensor of FIG. 1.

FIG. 12 is a plan view illustrating a process for manufacturing the light-detecting device according to the third embodiment.

FIG. 13 is a plan view illustrating a process for manufacturing the light-detecting device according to the third embodiment.

FIG. 14 is a plan view illustrating a process for manufacturing the light-detecting device according to the third embodiment.

FIG. 18 is a plan view of a modification of the light-detecting device according to the third embodiment.

FIG. 19 is a plan view of a modification of the light-detecting device according to the third embodiment.

FIG. 20 is a plan view of a modification of the light-detecting device according to the third embodiment.

FIG. 21 is a plan view of a modification of the light-detecting device according to the third embodiment.

FIG. 24 is a plan view illustrating a process for manufacturing the light-detecting device according to the fourth embodiment.

FIG. 25 is a plan view illustrating a process for manufacturing the light-detecting device according to the fourth embodiment and a plan view of a modification of the light-detecting device according to the fourth embodiment.

DESCRIPTION OF EMBODIMENTS

Figure 1:
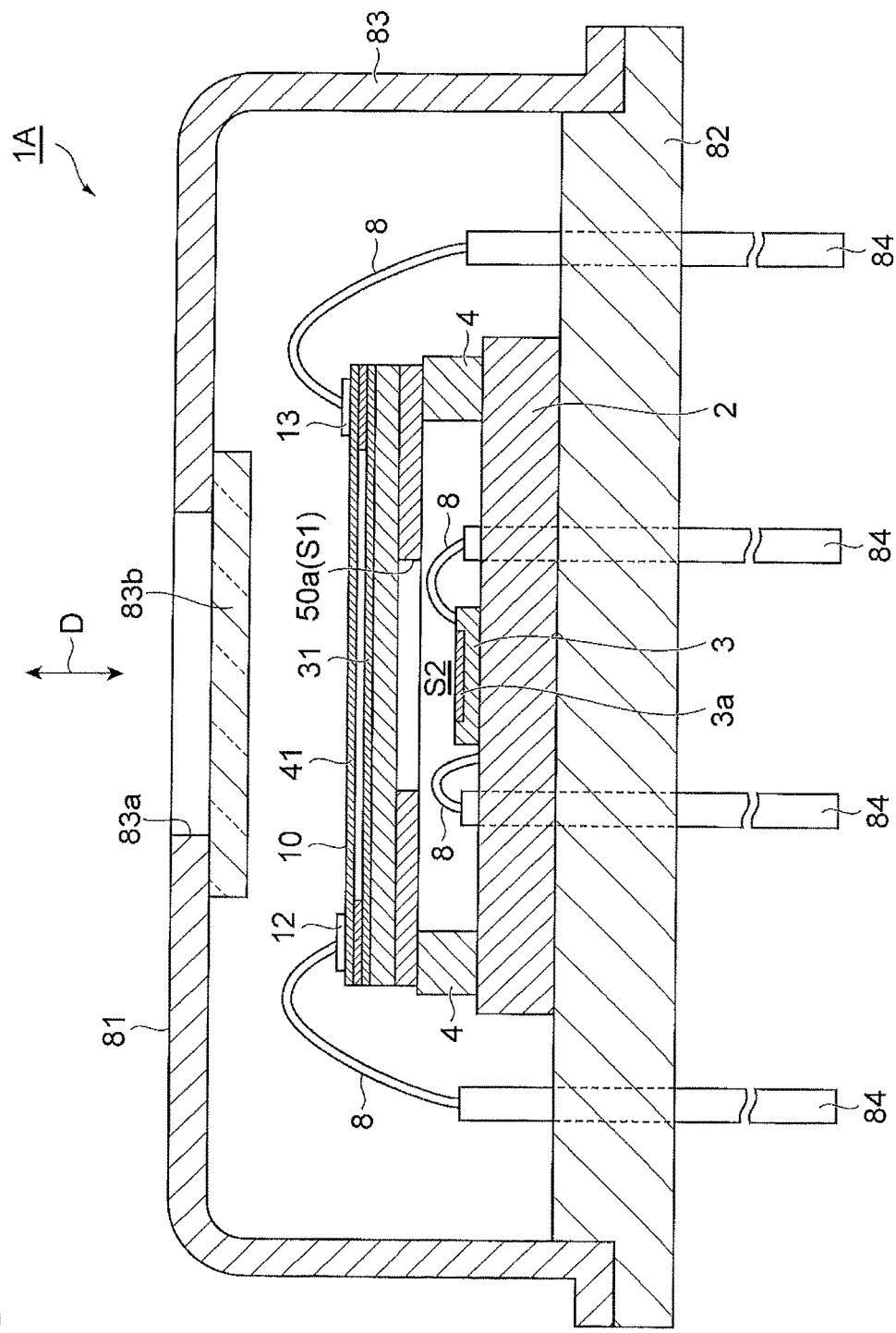
FIG. 1 is a cross-sectional view of a spectral sensor to be a light-detecting device according to a first embodiment.

Hereinafter, preferred embodiments of the present invention will be described in detail with reference to the drawings. In the individual drawings, the same or equivalent portions are denoted with the same reference numerals and overlapped portions are omitted.

First Embodiment

[Configuration of Spectral Sensor]

Figure 2:
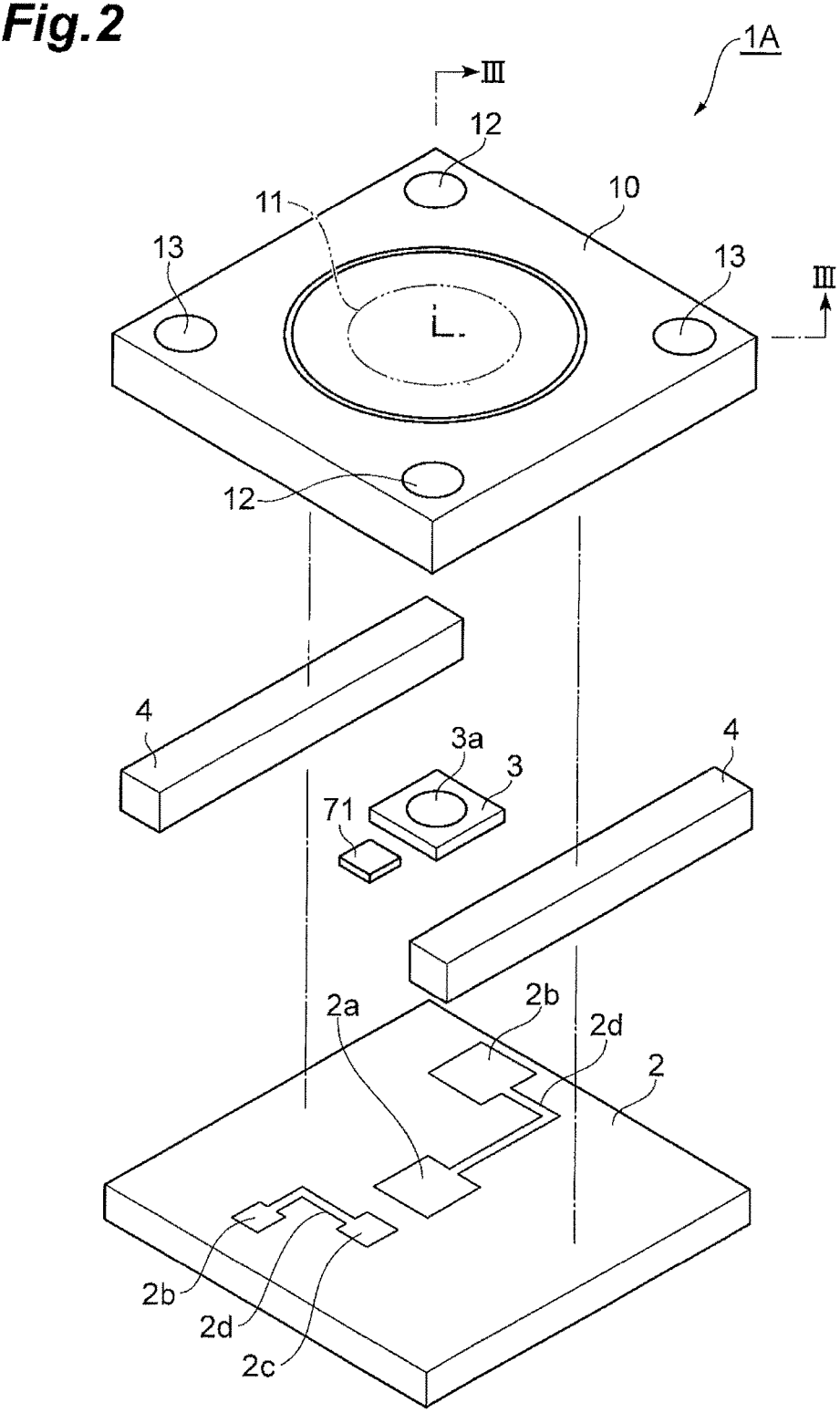
FIG. 2 is an exploded perspective view of a part of the spectral sensor of FIG. 1.

As illustrated in FIGS. 1 and 2, a spectral sensor (light-detecting device) 1A includes a wiring substrate 2, a light detector 3, a temperature compensation element (mounting component) 71 such as a thermistor, a plurality of spacers (support members) 4, and a Fabry-Perot interference filter 10. The Fabry-Perot interference filter 10 has a first mirror 31 and a second mirror 41 with variable distances. The Fabry-Perot interference filter 10 is provided with an opening 50a to pass light having transmitted according to a distance between the first mirror 31 and the second mirror 41 along a facing direction (predetermined direction) D of the first mirror 31 and the second mirror 41.

The light detector 3 has a light reception unit 3a that receives the light having passed through the opening 50a of the Fabry-Perot interference filter 10. The opening 50a and the light reception unit 3a face each other in the facing direction D. The light detector 3 is an infrared detector, for example. As the infrared detector, a quantum-type sensor using InGaAs or a thermal sensor using a thermopile or a bolometer can be used. When each of an ultraviolet (UV) region, a visible region, and a near-infrared region is detected, a silicon photodiode can be used as the light detector 3. In addition, the light detector 3 may have one light reception unit 3a and may have a plurality of light reception units 3a disposed in an array. In addition, a plurality of light detectors 3 may be mounted on the wiring substrate 2.

The light detector 3 and the temperature compensation element 71 are mounted on the wiring substrate 2. More specifically, a mounting unit 2a on which the light detector 3 is mounted, a mounting unit 2c on which the temperature compensation element 71 is mounted, and a plurality of electrode pads 2b are provided in the wiring substrate 2. The individual electrode pads 2b are electrically connected to the mounting units 2a and 2c by wiring lines 2d. In addition, materials of the wiring substrate are silicon, quartz, glass, ceramic, or plastic.

The plurality of spacers 4 are fixed on the wiring substrate 2. The Fabry-Perot interference filter 10 is fixed on the plurality of spacers 4. As such, the plurality of spacers 4 support the Fabry-Perot interference filter 10 on the wiring substrate 2. As a result, a second space S2 that is continuous with (connected to) a first space S1 in the opening 50a is formed between the Fabry-Perot interference filter 10 and the wiring substrate 2. The second space S2 includes the first space S1 when viewed from the facing direction D. That is, the second space S2 extends to the outside of an outer edge of the opening 50a to be an outer edge of the first space S1, when viewed from the facing direction D.

To suppress an influence of thermal strain on the Fabry-Perot interference filter 10, the plurality of spacers 4 and the Fabry-Perot interference filter 10 are preferably adhered to each other by a die bond resin. As the die bond resin, flexible resin materials (for example, resin materials such as silicone resins, urethane resins, epoxy resins, acrylic resins, and hybrid resins, which may be conductive or non-conductive) can be used. The resin materials are preferably selected from materials of which elastic modulus (or Young's modulus) is smaller than 1000 MPa and are more preferably selected from materials of which elastic modulus (or Young's modulus) is smaller than 10 MPa. In addition, the resin materials are preferably selected from resin materials of which glass transition temperatures deviate from use environment temperature of the spectral sensor 1A.

Here, in the die bond resin 5 functioning as an adhesive agent to adhere the spacers 4 and the Fabry-Perot interference filter 10 to each other, hardness after hardening is smaller than hardness of an adhesive agent to adhere the spacers 4 and the wiring substrate 2 to each other. For example, the spacers 4 and the Fabry-Perot interference filter 10 are preferably fixed by an adhesive agent made of a silicon resin material of which elastic modulus after hardening is smaller than 10 MPa. In the case of the silicon resin material, a glass transition temperature is about −10° C., for example, and is lower than normal use environment temperatures of 5 to 40° C., for example. In addition, the spacers 4 and the wiring substrate 2 are preferably fixed by an adhesive agent made of an epoxy resin material of which elastic modulus after hardening is equal to or larger than 100 MPa. As a result, the spacers 4 and the wiring substrate 2 can be fixed firmly and the thermal strain from a peripheral member of the Fabry-Perot interference filter 10 can be suppressed from being transmitted to the Fabry-Perot interference filter 10 via the adhesive agent.

In the spectral sensor 1A, an edge of the opening 50a of the Fabry-Perot interference filter 10 and each spacer 4 are separated from each other. As a result, even though the die bond resin protrudes at the time of mounting the Fabry-Perot interference filter 10, the protruding die bond resin moves to the side of each spacer 4. Therefore, the protruding die bond resin can be prevented from entering the opening 50a.

In addition, silicon, ceramic, quartz, glass, or plastic can be used as examples of a material of the plurality of spacers 4. Particularly, to alleviate a difference of thermal expansion coefficients with portions contacting the plurality of spacers 4 in the Fabry-Perot interference filter 10, the material of the plurality of spacers 4 is preferably a material of which a thermal expansion coefficient is equal to or smaller than a thermal expansion coefficient of the material of the Fabry-Perot interference filter 10. For example, when the Fabry-Perot interference filter 10 is formed on a silicon substrate, the plurality of spacers 4 are preferably formed of a material having a small thermal expansion coefficient, such as the quartz and the silicon. In addition, instead of a configuration in which the wiring substrate 2 and the spacers 4 are formed separately as described above, a configuration in which portions becoming the spacers 4 are integrally formed on a surface of the wiring substrate 2 may be used.

The spectral sensor 1A further includes a CAN package (package) 81 that accommodates the wiring substrate 2, the light detector 3, the temperature compensation element 71, the plurality of spacers 4, and the Fabry-Perot interference filter 10. The CAN package 81 has a stem 82 and a cap 83. The cap 83 is provided with a light transmission window (light incidence unit) 83a. The light transmission window 83a is configured by adhering a plate-like window member 83b to an opening provided in the cap 83 from an inner side, using the resin or low melting point glass. In addition, the light transmission window 83a may be formed by forming welding glass in the cap. The light transmission window 83a causes light to be incident on the Fabry-Perot interference filter 10 from the outside.

The wiring substrate 2 is fixed on the stem 82. A plurality of electrode pads 2b of the wiring substrate 2, a terminal of the light detector 3, a terminal of the temperature compensation element 71, and terminals 12 and 13 of the Fabry-Perot interference filter 10 are respectively electrically connected to each of a plurality of lead pins 84 penetrating the stem 82 by wires 8. As a result, an input/output of an electric signal with respect to each of the light detector 3, the temperature compensation element 71, and the Fabry-Perot interference filter 10 is executed. In the spectral sensor 1A, because the spacers 4 are disposed right below the individual terminals 12 and 13 of the Fabry-Perot interference filter 10, wire bonding performance is improved.

In one embodiment, a thickness of the wiring substrate 2 along a predetermined direction is 0.3 mm, a height of a spacer 4B is 0.4 mm, and a thickness of the Fabry-Perot interference filter 10 is 0.6 mm. In addition, a height of a portion where a lead pin 6b protrudes from a top surface of a base 6a is 0.5 mm. That is, a top surface of the lead pin 6b is positioned lower than a top surface of the Fabry-Perot interference filter 10. In addition, the top surface of the lead pin 6b is positioned lower than a top surface of the spacer 4B. As a result, connection of the wire from the Fabry-Perot interference filter 10 or the light detector 3 to the lead pin 6b is easily performed.

In the spectral sensor 1A configured as described above, if measurement light is incident on the Fabry-Perot interference filter 10 via the light transmission window 83a from the outside, light having a predetermined wavelength according to a distance between the first mirror 31 and the second mirror 41 transmits the first mirror 31 and the second mirror 41. The light having transmitted the first mirror 31 and the second mirror 41 passes through the opening 50a, is incident on the light reception unit 3a of the light detector 3, and is detected by the light detector 3. In the spectral sensor 1A, the light having transmitted the Fabry-Perot interference filter 10 is detected by the light detector 3 while a voltage applied to the Fabry-Perot interference filter 10 is changed (that is, the distance between the first mirror 31 and the second mirror 41 is changed), so that a spectral spectrum can be obtained.

[Configuration of Fabry-Perot Interference Filter]

Figure 3:
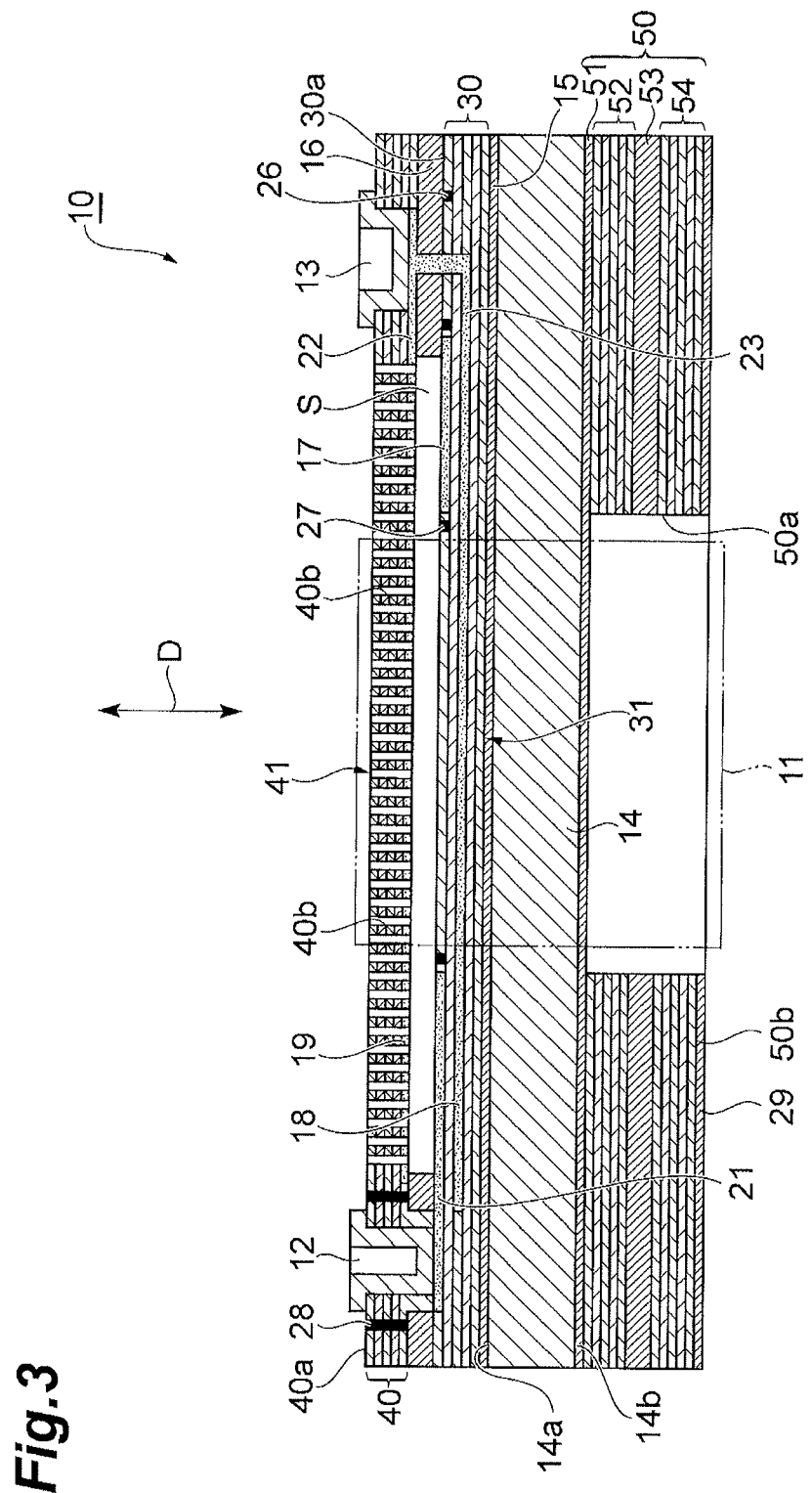
FIG. 3 is a cross-sectional view of a Fabry-Perot interference filter taken along line III-III of FIG. 2.

As illustrated in FIG. 3, the Fabry-Perot interference filter 10 includes a substrate 14. A reflection prevention layer 15, a first laminate 30, a sacrificial layer 16, and a second laminate 40 are sequentially stacked on a surface 14a of a light incidence side of the substrate 14. A gap (air gap) S is formed between the first laminate 30 and the second laminate 40 by the sacrificial layer 16 of a frame shape. In the Fabry-Perot interference filter 10, the measurement light is incident on the second laminate 40 from the side opposite to the substrate 14. In addition, light having a predetermined wavelength transmits the light transmission region 11 defined in a center portion of the Fabry-Perot interference filter 10.

In addition, the substrate 14 is made of silicon, quartz, or glass, for example. When the substrate 14 is made of the silicon, the reflection prevention layer 15 and the sacrificial layer 16 are made of silicon oxide, for example. A thickness of the sacrificial layer 16 is 200 nm to 10 μm. The thickness of the sacrificial layer 16 is preferably the integral multiple of ½ of a center transmission wavelength (that is, a wavelength to be a center of a variable range of a transmission wavelength of the Fabry-Perot interference filter 10).

A portion corresponding to the light transmission region 11 in the first laminate 30 functions as the first mirror 31. The first laminate 30 is configured by laminating a plurality of polysilicon layers and a plurality of silicon nitride layers alternately. An optical thickness of each of the polysilicon layer and the silicon nitride layer configuring the first mirror 31 is preferably the integral multiple of ¼ of the center transmission wavelength (center wavelength of the variable wavelength range). In addition, instead of the silicon nitride layer, a silicon oxide layer may be used.

A portion corresponding to the light transmission region 11 in the second laminate 40 functions as the second mirror 41 facing the first mirror 31 with the gap S therebetween. Similar to the first laminate 30, the second laminate 40 is configured by laminating a plurality of polysilicon layers and a plurality of silicon nitride layers alternately. An optical thickness of each of the polysilicon layer and the silicon nitride layer configuring the second mirror 41 is preferably the integral multiple of ¼ of the center transmission wavelength (center wavelength of the variable wavelength range). In addition, instead of the silicon nitride layer, a silicon oxide layer may be used.

In addition, a plurality of through-holes 40b extending from a surface 40a of the second laminate 40 to the gap S are distributed uniformly in a portion corresponding to the gap S in the second laminate 40. The plurality of through-holes 40b are formed not to substantially affect a function of the second mirror 41. A diameter of each through-hole 40b is 100 nm to 5 μm. In addition, an opening area of the plurality of through-holes 40b occupies 0.01 to 10% of an area of the second mirror 41.

In the Fabry-Perot interference filter 10, the first mirror 31 and the second mirror 41 are supported to the substrate 14. In addition, the first mirror 31 is disposed on a light incidence side of the substrate 14. The second mirror 41 is disposed on a light incidence side of the first mirror 31 with the gap S therebetween.

In the first mirror 31, a first electrode 17 is formed to surround the light transmission region 11. In addition, in the first mirror 31, a second electrode 18 is formed to include the light transmission region 11. The first electrode 17 and the second electrode 18 are formed by doping impurities into the polysilicon layer and decreasing resistance. A size of the second electrode 18 is preferably a size including an entire region of the light transmission region 11. However, the size of the second electrode 18 may be approximately equal to a size of the light transmission region 11.

In the second mirror 41, a third electrode 19 is formed. The third electrode 19 faces the first electrode 17 and the second electrode 18 with the gap S therebetween, in the facing direction D. The third electrode 19 is formed by doping the impurities into the polysilicon layer and decreasing resistance.

In the Fabry-Perot interference filter 10, the second electrode 18 is positioned at the side opposite to the third electrode 19 with respect to the first electrode 17, in the facing direction D. That is, the first electrode 17 and the second electrode 18 are not disposed on the same plane in the first mirror 31. The second electrode 18 is separated from the third electrode 19 more than the first electrode 17.

The terminals 12 apply a voltage to the Fabry-Perot interference filter 10. The pair of terminals 12 is provided to face each other with the light transmission region 11 therebetween. Each terminal 12 is disposed in the through-holes extending from the surface 40a of the second laminate 40 to the first laminate 30. Each terminal 12 is electrically connected to the first electrode 17 via a wiring line 21.

The terminals 13 apply a voltage to the Fabry-Perot interference filter 10. The pair of terminals 13 is provided to face each other with the light transmission region 11 therebetween. A facing direction of the pair of terminals 12 and a facing direction of the pair of terminals 13 are orthogonal to each other. Each terminal 13 is electrically connected to the third electrode 19 via a wiring line 22. In addition, the third electrode 19 is electrically connected to the second electrode 18 via a wiring line 23.

Trenches 26 and 27 are provided in the surface 30a of the first laminate 30. The trench 26 extends annularly to surround the wiring line 23 extending along the facing direction D from the terminal 13. The trench 26 electrically insulates the first electrode 17 and the wiring line 23 from each other. The trench 27 extends annularly along an inner edge of the first electrode 17. The trench 27 electrically insulates the first electrode 17 and an inner region of the first electrode 17. A region in each of the trenches 26 and 27 may be an insulating material and may be a gap.

A trench 28 is provided are provided in the surface 40a of the second laminate 40. The trench 28 extends annularly to surround the terminal 12. A bottom surface of the trench 28 reaches the sacrificial layer 16. The trench 28 electrically insulates the terminal 12 and the third electrode 19 from each other. A region in the trench 28 may be an insulating material and may be a gap.

A reflection prevention layer 51, a third laminate 52, an intermediate layer 53, and a fourth laminate 54 are sequentially stacked on a surface 14b of a light emission side of the substrate 14. The reflection prevention layer 51 and the intermediate layer 53 have the same configurations as the configurations of the reflection prevention layer 15 and the sacrificial layer 16, respectively. The third laminate 52 and the fourth laminate 54 have lamination structures symmetrical to lamination structures of the first laminate 30 and the second laminate 40, on the basis of the substrate 14. A stress adjustment layer 50 is configured by the reflection prevention layer 51, the third laminate 52, the intermediate layer 53, and the fourth laminate 54. The stress adjustment layer 50 is disposed on the light emission side of the substrate 14 and has a function of suppressing a warp of the substrate 14.

The opening 50a is provided in the stress adjustment layer 50 to include the light transmission region 11. The opening 50a is opened to the light emission side with respect to the substrate 14 and is formed in a cylindrical shape, for example. A light shielding layer 29 is formed on a surface 50b of the light emission side of the stress adjustment layer 50. The light shielding layer 29 is made of aluminum and has a function of shielding the measurement light.

In the Fabry-Perot interference filter 10 configured as described above, if a voltage is applied between the first electrode 17 and the third electrode 19 through the terminals 12 and 13, electrostatic force according to the voltage is generated between the first electrode 17 and the third electrode 19. By the electrostatic force, the second mirror 41 is driven to be attracted to the side of the first mirror 31 fixed on the substrate 14. By the drive, the distance between the first mirror 31 and the second mirror 41 is adjusted. The wavelength of the light transmitting the Fabry-Perot interference filter 10 depends on the distance between the first mirror 31 and the second mirror 41 in the light transmission region 11. Therefore, the wavelength of the transmitting light can be appropriately selected by adjusting the voltage applied between the first electrode 17 and the third electrode 19. At this time, the second electrode 18 has the same potential as the potential of the third electrode 19 electrically connected to the second electrode 18. Therefore, the second electrode 18 functions as a compensation electrode to maintain the first mirror 31 and the second mirror 41 in the light transmission region 11 evenly.

[Arrangement Relation of Light Transmission Window, Fabry-Perot Interference Filter, and Light Detector in Spectral Sensor]

Figure 4:
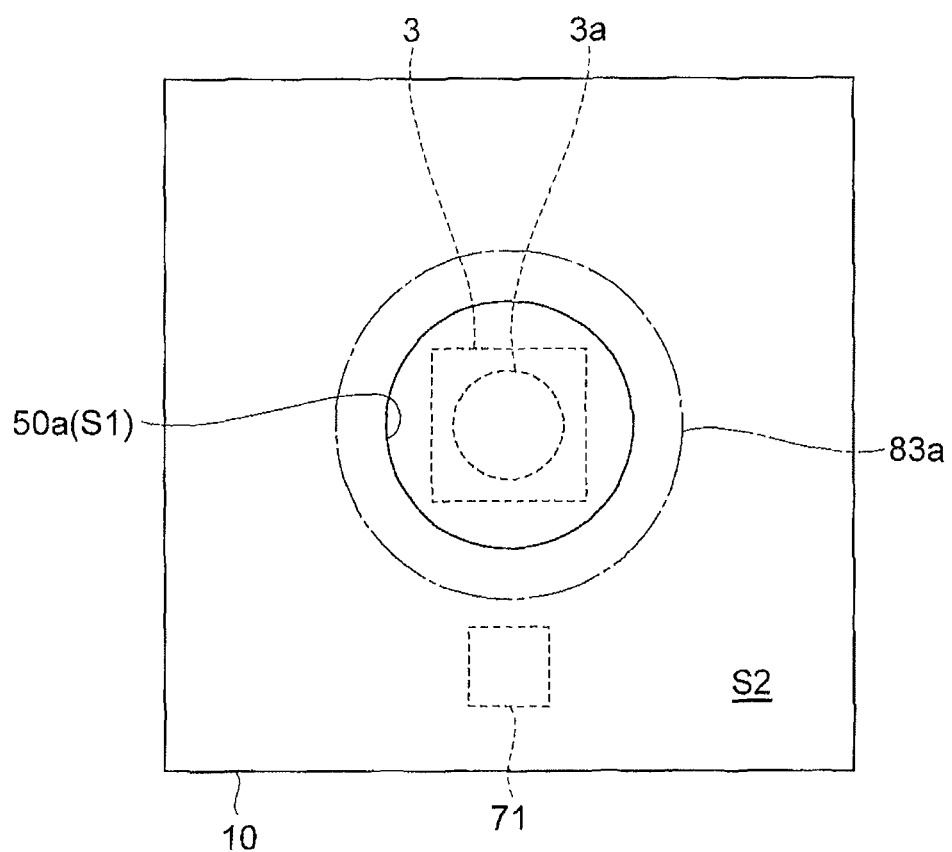
FIG. 4 is a diagram illustrating an arrangement relation of a light incidence unit, the Fabry-Perot interference filter, and a light detector in the spectral sensor of FIG. 1.

FIG. 4 is a diagram illustrating an arrangement relation of individual components when viewed from the facing direction D. As illustrated in FIGS. 1 and 4, an entire portion of the light detector 3 is disposed in a region corresponding to the first space S1 in the second space S2 when viewed from the facing direction D (that is, the region overlaps the first space S1 in the second space S2 when viewed from the facing direction D). Therefore, an entire portion of the light reception unit 3a of the light detector 3 is also disposed in the region corresponding to the first space S1 in the second space S2 when viewed from the facing direction D.

Similar to the light detector 3, the temperature compensation element 71 is disposed in the second space S2. However, an entire portion of the temperature compensation element 71 is disposed outside the region corresponding to the first space S1 in the second space S2 when viewed from the facing direction D. An entire portion of the light transmission window 83a of the CAN package 81 is included in the Fabry-Perot interference filter 10 when viewed from the facing direction D.

[Function and Effect]

In the spectral sensor 1A, the light reception unit 3a of the light detector 3 is disposed in the region corresponding to the first space S1 in the opening 50a provided in the Fabry-Perot interference filter 10, in the second space S2 formed between the Fabry-Perot interference filter 10 and the wiring substrate 2. For this reason, light having transmitted a region paralleled in the first mirror 31 and the second mirror 41 becomes easy to arrive at the light reception unit 3a of the light detector 3. That is, when the second mirror 41 is moved in a direction toward the first mirror 31, the second mirror 41 is bent to the side of the first mirror 31 to become convex. However, light having transmitted a region near the center where flexure is relatively small (parallelism of the first mirror 31 and the second mirror 41 is high) becomes easy to arrive at the light reception unit 3a of the light detector 3. As a result, wavelength resolution can be improved. In addition, the light reception unit 3a of the light detector 3 is disposed in the second space S2 that is continuous with the first space S1. For this reason, the distances from the first mirror 31 and the second mirror 41 to the light reception unit 3a of the light detector 3 increase and light (light incident from the facing direction D or a slightly oblique direction) incident on the Fabry-Perot interference filter 10 at a small incidence angle becomes easy to arrive at the light reception unit 3a of the light detector 3 after passing through the opening 50a. As a result, the wavelength resolution can be improved and the wavelength shift can be suppressed. In addition, the light detector 3 is disposed in the second space S2 formed between the Fabry-Perot interference filter 10 and the wiring substrate 2. For this reason, stray light other than the light having transmitted the first mirror 31 and the second mirror 41 and having passed through the opening 50a becomes hard to arrive at the light reception unit 3a of the light detector 3. As a result, the stray light is reduced, so that a spectral characteristic can be improved.

In addition, in the spectral sensor 1A, the light detector 3 is disposed in the region corresponding to the first space S1 in the second space S2 when viewed from the facing direction D. As a result, a cost of the spectral sensor 1A can be decreased by miniaturizing the light detector 3. In addition, the temperature compensation element 71 can be disposed in the second space S2 formed between the Fabry-Perot interference filter 10 and the wiring substrate 2 and the spectral sensor 1A can be miniaturized even when the mounting component such as the temperature compensation element 71 is added.

In addition, in the spectral sensor 1A, the temperature compensation element 71 is disposed outside the region corresponding to the first space S1 in the second space S2 when viewed from the facing direction D. As a result, reflection of the light in the temperature compensation element 71 can be suppressed and the stray light is reduced, so that the spectral characteristic can be further improved.

In addition, in the spectral sensor 1A, the light transmission window 83a of the CAN package 81 is included in the Fabry-Perot interference filter 10 when viewed from the facing direction D. As a result, light incident on an inner portion of the CAN package 81 from the light transmission window 83a can be suppressed from being incident on the light reception unit 3a of the light detector 3 from a surrounding portion of the Fabry-Perot interference filter 10 and the stray light is reduced, so that the spectral characteristic can be further improved. In addition, light incident into the Fabry-Perot interference filter 10 at a small incidence angle becomes easy to arrive at the light reception unit 3a of the light detector 3. As a result, the wavelength resolution can be improved and the wavelength shift can be suppressed.

In addition, in the spectral sensor 1A, the light reception unit 3a of the light detector 3 is disposed in the second space S2 that is continuous with the first space S1. For this reason, the distances from the first mirror 31 and the second mirror 41 to the light reception unit 3a of the light detector 3 increase and the opening 50a (first space S1) is provided to increase the distance from a bottom surface (bottom surface of the substrate 14) of the Fabry-Perot interference filter 10 to the light reception unit 3a. For this reason, an influence of optical interference between the Fabry-Perot interference filter 10 and the light detector 3 becomes hard to occur. As a result, the spectral characteristic can be improved. In addition, even when thermal damage and physical damage are applied, an influence of physical interference between the Fabry-Perot interference filter 10 and the light detector 3 becomes hard to occur. In addition, because retention of a heat generated according to the operation of the Fabry-Perot interference filter 10 when the voltage is applied is reduced, an influence of the temperature on a characteristic of the light detector 3 is alleviated.

In addition, in the spectral sensor 1A, the light detector 3 is disposed in the second space S2 including the first space S1 (that is, in the second space S2 larger than the first space S1) when viewed from the facing direction D. As a result, because the space for the wire bonding is secured, a special structure does not need to be adopted in the light detector 3. In addition, because the temperature compensation element 71 can be disposed in the vicinity of the light detector 3, compensation efficiency can be improved. In addition, because the retention of the heat is reduced, the influence of the temperature on the characteristic of the light detector 3 is alleviated. In addition, because a space in which a volatile component such as the die bond resin by the heat disperses becomes wider, the risk of the volatile component adhering to an optical path again and disturbing the optical path is reduced. In addition, because a degree of freedom of a specification such as an increase in the width of the light detector 3 increases, the spectral sensor 1A having high performance can be realized.

Figure 5:
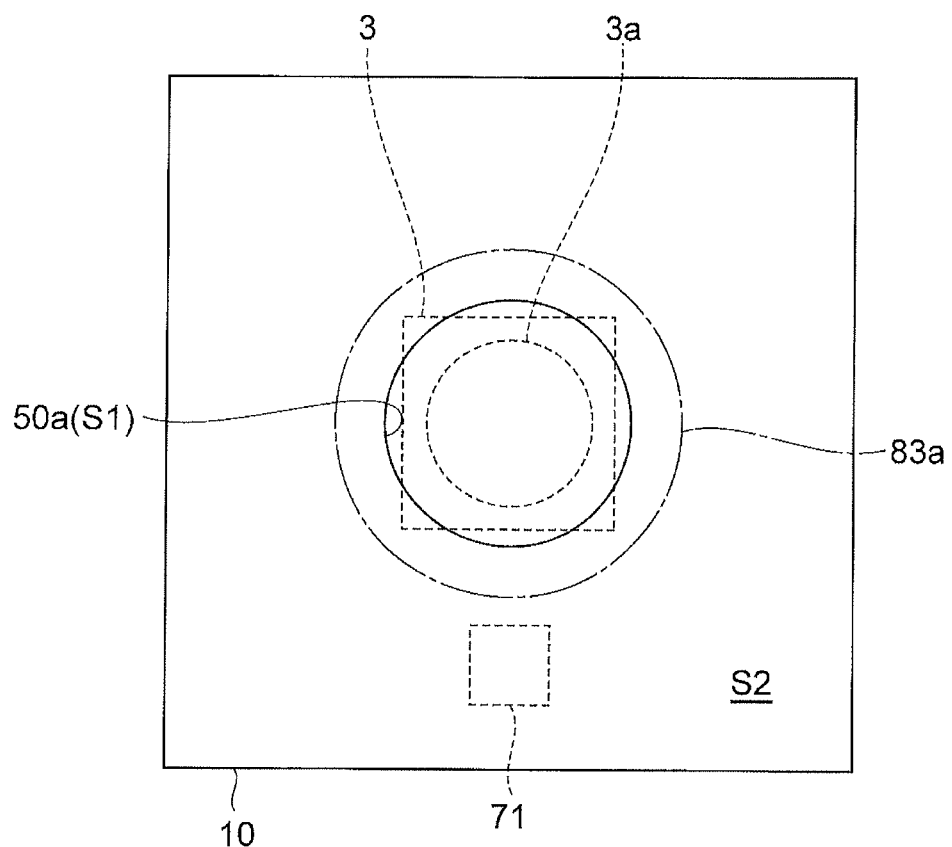
FIG. 5 is a diagram illustrating an arrangement relation of a light incidence unit, a Fabry-Perot interference filter, and a light detector in a modification of the spectral sensor of FIG. 1.

As illustrated in FIG. 5, if the entire portion of the light reception unit 3a of the light detector 3 is disposed in the region corresponding to the first space S1 in the second space S2 when viewed from the facing direction D, the entire portion of the light detector 3 may not be disposed in the region. Even in this case, because the light detector 3 is disposed in the second space S2 formed between the Fabry-Perot interference filter 10 and the wiring substrate 2, the stray light other than the light having transmitted the first mirror 31 and the second mirror 41 and having passed through the opening 50a becomes hard to arrive at the light reception unit 3a of the light detector 3. As a result, the spectral characteristic can be improved.

Second Embodiment

[Configuration of Spectral Sensor]

Figure 6:
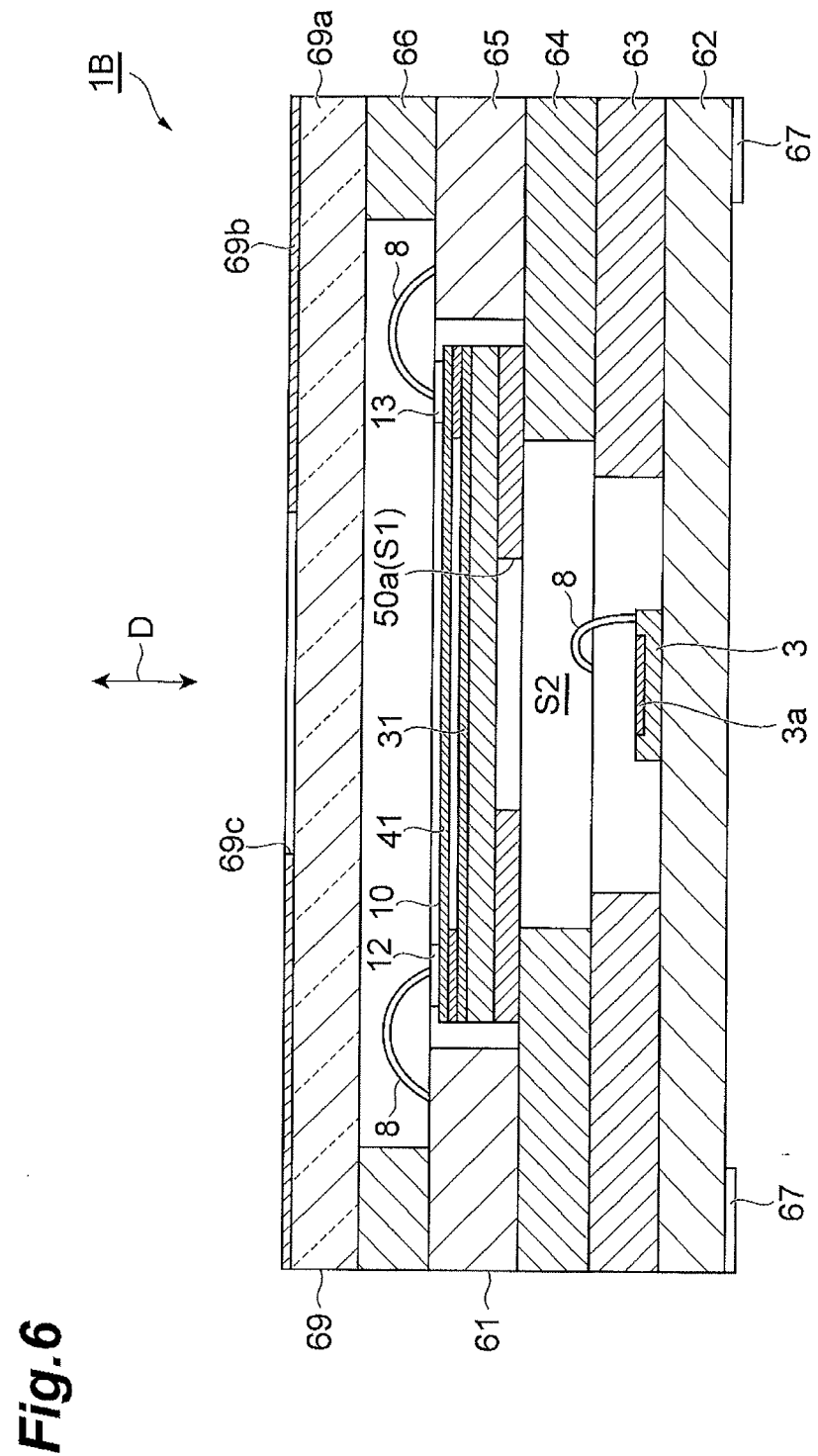
FIG. 6 is a cross-sectional view of a spectral sensor to be a light-detecting device according to a second embodiment.

As illustrated in FIG. 6, a spectral sensor 1B is different from the spectral sensor 1A in that the spectral sensor 1B is configured as a surface mount device (SMD). The spectral sensor 1B includes an SMD package (package) 61 that accommodates a light detector 3, a temperature compensation element 71 (not illustrated in the drawings), and a Fabry-Perot interference filter 10. The SMD package 61 has a first layer substrate 62, a second layer substrate 63, a third layer substrate 64, a fourth layer substrate 65, a fifth layer substrate 66, and a sixth layer substrate 69.

The first layer substrate 62, the second layer substrate 63, the third layer substrate 64, the fourth layer substrate 65, the fifth layer substrate 66, and the sixth layer substrate 69 are sequentially stacked. An opening is provided in a center portion of each of the second layer substrate 63, the third layer substrate 64, the fourth layer substrate 65, and the fifth layer substrate 66. The opening of the third layer substrate 64 is larger than the opening of the second layer substrate 63. The opening of the fourth layer substrate 65 is larger than the opening of the third layer substrate 64. The opening of the fifth layer substrate 66 is larger than the opening of the fourth layer substrate 65. As a result, a part of a surface of each of the first layer substrate 62, the second layer substrate 63, the third layer substrate 64, and the fourth layer substrate 65 is exposed from the opening of the fifth layer substrate 66.

The light detector 3 and the temperature compensation element 71 (not illustrated in the drawings) are fixed on the exposed surface of the first layer substrate 62. One terminal of each of the light detector 3 and the temperature compensation element 71 (not illustrated in the drawings) is electrically connected to a bonding pad provided on the exposed surface of the first layer substrate 62 by conductive paste or solder. The other terminal of each of the light detector 3 and the temperature compensation element 71 (not illustrated in the drawings) is electrically connected to a bonding pad provided on the exposed surface of the second layer substrate 63 by a wire 8. The bonding pad of the first layer substrate 62 and the bonding pad of the second layer substrate 63 are electrically connected to a plurality of electrode pads 67 provided on a back surface of the first layer substrate 62 by wiring lines (not illustrated in the drawings). The first layer substrate 62 and the second layer substrate 63 function as a wiring substrate on which the light detector 3 and the temperature compensation element 71 (not illustrated in the drawings) are mounted.

The Fabry-Perot interference filter 10 is fixed on the exposed surface of the third layer substrate 64. Individual terminals 12 and 13 of the Fabry-Perot interference filter 10 are electrically connected to a plurality of bonding pads provided on the exposed surface of the fourth layer substrate 65 by the wire 8. The plurality of bonding pads of the fourth layer substrate 65 are electrically connected to the plurality of electrode pads 67 provided on the back surface of the first layer substrate 62 by the wiring lines (not illustrated in the drawings). The third layer substrate 64 functions as a support member to support the Fabry-Perot interference filter 10 on the first layer substrate 62 and the second layer substrate 63. As a result, a second space S2 is formed between the Fabry-Perot interference filter 10 and the first layer substrate 62 and the second layer substrate 63 functioning as the wiring substrate. The second space S2 is continuous with a first space S1 in an opening 50a of the Fabry-Perot interference filter 10 and includes the first space S1 when viewed from a facing direction D.

A die bond resin 5 functioning as an adhesive agent used to fix the Fabry-Perot interference filter 10 on a top surface of the third layer substrate 64 is softer than an adhesive agent used to fix the light detector 3 on a top surface of the first layer substrate 62. In addition, when the first layer substrate 62, the second layer substrate 63, the third layer substrate 64, the fourth layer substrate 65, and the fifth layer substrate 66 formed separately are stacked to form the SMD package 61, the die bond resin 5 is softer than an adhesive agent to adhere the substrates adjacent to each other. As a result, fixation of the light detector 3 and the first layer substrate 62 and formation of the SMD package 61 are performed firmly and thermal strain from a peripheral member of the Fabry-Perot interference filter 10 can be suppressed from being transmitted to the Fabry-Perot interference filter 10 via the adhesive agent.

As examples of a material of the first layer substrate 62, the second layer substrate 63, the third layer substrate 64, the fourth layer substrate 65, and the fifth layer substrate 66, ceramic or a resin can be used. The first layer substrate 62, the second layer substrate 63, the third layer substrate 64, the fourth layer substrate 65, and the fifth layer substrate 66 are not limited to the configuration in which the first layer substrate 62, the second layer substrate 63, the third layer substrate 64, the fourth layer substrate 65, and the fifth layer substrate 66 are stacked after being formed separately and may be formed integrally.

The sixth layer substrate 69 has a light transmission substrate 69a and a light shielding layer 69b. As a material of the light transmission substrate 69a, a material (for example, glass, silicon, or germanium) corresponding to an application wavelength range of the spectral sensor 1B can be used. The light shielding layer 69b is formed on a surface of the light transmission substrate 69a. As examples of a material of the light shielding layer 69b, a metal such as aluminum and a chromium oxide, a light shielding material such as a metal oxide and a black resin, or a light absorption material can be used. A light passage hole (light incidence unit) 69c is provided in the light shielding layer 69b. The light passage hole 69c causes light to be incident on the Fabry-Perot interference filter 10 from the outside. The light shielding layer 69b may be formed on a back surface side of the light transmission substrate 69a, not a surface side thereof. A light reflection prevention layer may be formed on a single surface or both surfaces of the light transmission substrate 69a. In addition, a band-pass filter to restrict the application wavelength range may be used as the light transmission substrate 69a.

[Arrangement Relation of Light Passage Hole, Fabry-Perot Interference Filter, and Light Detector in Spectral Sensor]

In the spectral sensor 1B, an entire portion of the light detector 3 is disposed in a region corresponding to the first space S1 in the second space S2 when viewed from the facing direction D (that is, the region overlaps the first space S1 in the second space S2 when viewed from the facing direction D). Therefore, an entire portion of the light reception unit 3a of the light detector 3 is also disposed in the region corresponding to the first space S1 in the second space S2 when viewed from the facing direction D.

Similar to the light detector 3, the temperature compensation element 71 (not illustrated in the drawings) is disposed in the second space S2. However, an entire portion of the temperature compensation element 71 is disposed outside the region corresponding to the first space S1 in the second space S2 when viewed from the facing direction D.

An entire portion of the light passage hole 69c of the sixth layer substrate 69 is included in the Fabry-Perot interference filter 10 when viewed from the facing direction D.

[Function and Effect]

In the spectral sensor 1B, the light reception unit 3a of the light detector 3 is disposed in the region corresponding to the first space S1 in the second space S2. For this reason, light having transmitted a region paralleled in the first mirror 31 and the second mirror 41 becomes easy to arrive at the light reception unit 3a of the light detector 3. As a result, wavelength resolution can be improved. In addition, the light reception unit 3a of the light detector 3 is disposed in the second space S2 that is continuous with to the first space S1. For this reason, the distances from the first mirror 31 and the second mirror 41 to the light reception unit 3a of the light detector 3 increase and light incident on the Fabry-Perot interference filter 10 at a small incidence angle becomes easy to arrive at the light reception unit 3a of the light detector 3. As a result, the wavelength resolution can be improved and the wavelength shift can be suppressed. In addition, the light detector 3 is disposed in the second space S2. For this reason, stray light other than the light having transmitted the first mirror 31 and the second mirror 41 and having passed through the opening 50a becomes hard to arrive at the light reception unit 3a of the light detector 3. As a result, the stray light is reduced, so that a spectral characteristic can be improved.

In addition, in the spectral sensor 1B, the light detector 3 is disposed in the region corresponding to the first space S1 in the second space S2 when viewed from the facing direction D. As a result, a cost of the spectral sensor 1B can be decreased by miniaturizing the light detector 3. In addition, the temperature compensation element 71 can be disposed in the second space S2 and the spectral sensor 1B can be miniaturized.

In addition, in the spectral sensor 1B, the temperature compensation element 71 is disposed outside the region corresponding to the first space S1 in the second space S2 when viewed from the facing direction D. As a result, reflection of the light in the temperature compensation element 71 can be suppressed and the stray light is reduced, so that the spectral characteristic can be further improved.

In addition, in the spectral sensor 1B, the light passage hole 69c of the SMD package 61 is included in the Fabry-Perot interference filter 10 when viewed from the facing direction D. As a result, light incident on an inner portion of the SMD package 61 from the light passage hole 69c can be suppressed from being incident on the light reception unit 3a of the light detector 3 from a surrounding portion of the Fabry-Perot interference filter 10 and the stray light is reduced, so that the spectral characteristic can be further improved. In addition, light incident on the Fabry-Perot interference filter at a small incidence angle becomes easy to arrive at the light reception unit 3a of the light detector 3. As a result, the wavelength resolution can be improved and the wavelength shift can be suppressed.

In addition, in the spectral sensor 1B, the light reception unit 3a of the light detector 3 is disposed in the second space S2 that is continuous with the first space S1. For this reason, distances from the first mirror 31 and the second mirror 41 to the light reception unit 3a of the light detector 3 increase and an influence of optical interference between the Fabry-Perot interference filter 10 and the light detector 3 becomes hard to occur. As a result, the spectral characteristic can be improved. In addition, even when thermal damage and physical damage are applied, an influence of physical interference between the Fabry-Perot interference filter 10 and the light detector 3 becomes hard to occur.

In addition, in the spectral sensor 1B, the light detector 3 is disposed in the second space S2 including the first space S1 (that is, in the second space S2 larger than the first space S1) when viewed from the facing direction D. As a result, because the space for the wire bonding is secured, a special structure does not need to be adopted in the light detector 3. In addition, because the temperature compensation element 71 can be disposed in the vicinity of the light detector 3, compensation efficiency can be improved. In addition, because the retention of the heat is reduced, an influence of a temperature on a characteristic of the light detector 3 is alleviated. In addition, because a space in which a volatile component such as the die bond resin by the heat disperses becomes wider, the risk of the volatile component adhering to an optical path again and disturbing the optical path is reduced. In addition, because a degree of freedom of a specification such as an increase in the width of the light detector 3 increases, the spectral sensor 1B having high performance can be realized.

Similar to the spectral sensor 1A, in the spectral sensor 1B, if the entire portion of the light reception unit 3a of the light detector 3 is disposed in the region corresponding to the first space S1 in the second space S2 when viewed from the facing direction D, the entire portion of the light detector 3 may not be disposed in the region. Even in this case, because the light detector 3 is disposed in the second space S2, the stray light other than the light having transmitted the first mirror 31 and the second mirror 41 and having passed through the opening 50a becomes hard to arrive at the light reception unit 3a of the light detector 3. As a result, the spectral characteristic can be improved.

The first and second embodiments have been described. However, the present invention is not limited to the embodiments described above. For example, when the light detector 3 is a photodiode using InGaAs, as illustrated in FIG. 7(A), the light reception unit 3a may have a polygonal shape when viewed from the facing direction D or as illustrated in FIG. 7(B), the light reception unit 3a may have a circular shape when viewed from the facing direction D. A terminal 3b provided on the surface of the light detector 3 is an electrode pad of an anode side and a terminal 3c provided on the back surface of the light detector 3 is an electrode pad of a cathode side.

As illustrated in FIG. 7(A), if the light reception unit 3a has a polygonal shape when viewed from the facing direction D, a large area of the surface of the light detector 3 can be used as the light reception unit. For this reason, even when a size of the light detector 3 is decreased, an area of the light reception unit 3a can be increased. Therefore, even when the size of the light detector 3 is smaller than a size of the opening 50a of the Fabry-Perot interference filter 10 when viewed from the facing direction D, high sensitivity can be obtained.

Meanwhile, as illustrated in FIG. 7(B), if the light reception unit 3a has a circular shape when viewed from the facing direction D, high-speed response can be realized by miniaturizing the light reception unit 3a and resolution to a time can be improved. In addition, because the light detector 3 has superior stability against destruction to a bias, the light detector 3 is suitable for the case in which an operation is executed at a high bias. In addition, if the opening 50a of the Fabry-Perot interference filter 10 has a circular shape when viewed from the facing direction D, the shapes of the opening 50a and the light reception unit 3a are similar to each other, when viewed from the facing direction D. For this reason, the opening 50a and the light reception unit 3a become hard to deviate from each other, in a direction vertical to the facing direction D.

In addition, when the light detector 3 is a thermal infrared sensor such as a thermopile, as illustrated in FIG. 8(A), the light reception unit 3a on a membrane area 3d may have a polygonal shape when viewed from the facing direction D or as illustrated in FIG. 8(B), the light reception unit 3a on the membrane area 3d may have a circular shape when viewed from the facing direction D. The terminals 3b and 3c provided on the surface of the light detector 3 are a pair of electrode pads.

As illustrated in FIG. 8(A), if the light reception unit 3a has a polygonal shape when viewed from the facing direction D, a large area of the surface of the light detector 3 can be used as the light reception unit. For this reason, even though a size of the light detector 3 is decreased, an area of the light reception unit 3a can be increased. Therefore, even when the size of the light detector 3 is smaller than a size of the opening 50a of the Fabry-Perot interference filter 10 when viewed from the facing direction D, high sensitivity can be obtained.

Meanwhile, as illustrated in FIG. 8(B), if the light reception unit 3a has a circular shape when viewed from the facing direction D, the shapes of the opening 50a and the light reception unit 3a are similar to each other, when viewed from the facing direction D (in the case in which the opening 50a has a circular shape when viewed from the facing direction D). For this reason, the opening 50a and the light reception unit 3a become hard to deviate from each other, in a direction vertical to the facing direction D.

In addition, in the spectral sensor 1A, as illustrated in FIG. 9(A), the light detector 3 and lead pins 6b may be connected by two wires 8 via an electrode pad 2e provided in the wiring substrate 2, without connecting the light detector 3 and the lead pins 6b by one wire 8. In this case, even when a distance between the light detector 3 and the lead pins 6b is increased by miniaturizing the light detector 3, a short circuit in an unnecessary place can be prevented and a yield of the spectral sensor 1A can be improved.

In FIG. 9(A), the wiring substrate 2 is described as having a plane shape of a square. However, the present invention is not limited thereto. For example, as illustrated in FIG. 9(B), the wiring substrate 2A may have a plane shape of a rectangle long in a direction in which a distance between the lead pin 6b connected to the light detector 3 and the Fabry-Perot interference filter 10 is shortest. According to this configuration, electric connection of the lead pin 6b and an element such as the light detector 3 disposed on a top surface of the wiring substrate 2 becomes easy.

Third Embodiment

[Spectral Sensor]

Figure 10:
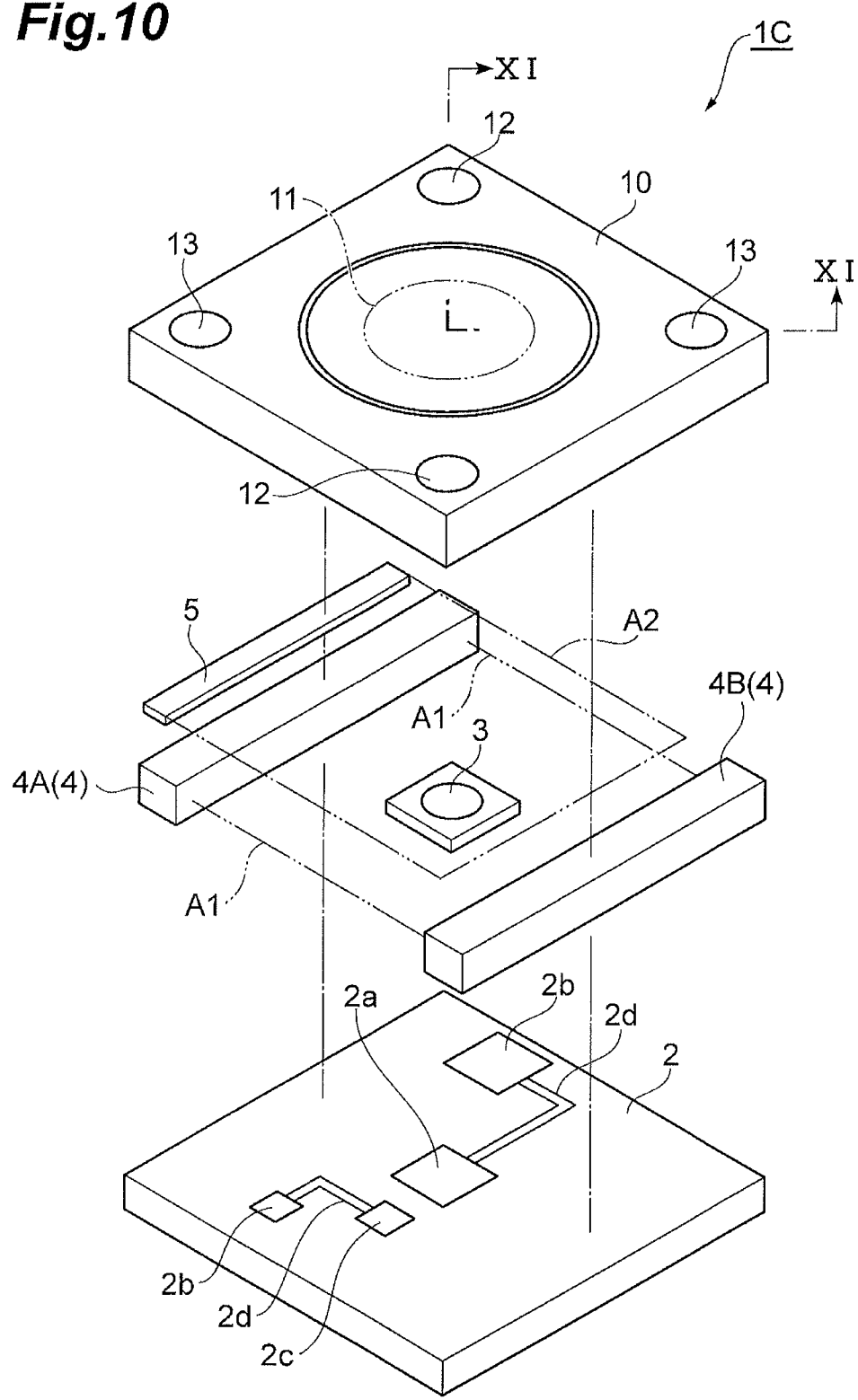
FIG. 10 is an exploded perspective view of a part of a light-detecting device according to a third embodiment.

As illustrated in FIG. 10, a spectral sensor (light-detecting device) 1C includes a wiring substrate 2, a light detector 3, a plurality of spacers (support members) 4, a die bond resin 5, and a Fabry-Perot interference filter 10. A mounting unit 2a, a plurality of electrode pads 2b, and a mounting unit 2c are provided on the wiring substrate 2. The light detector 3 is mounted on the mounting unit 2a. A temperature compensation element such as a thermistor is mounted on the mounting unit 2c. One of the electrode pads 2b is electrically connected to the mounting unit 2a by a wiring line 2d. The other of the electrode pads 2b is electrically connected to the thermistor disposed on the wiring substrate 2 by the wiring line 2d. In addition, the other of the electrode pads 2b electrically connects the thermistor to the outside of the spectral sensor 1C. The light detector 3 is an infrared detector, for example. As the infrared detector, a quantum-type sensor using InGaAs or a thermal sensor using a thermopile or a bolometer is exemplified. When each of an ultraviolet (UV) region, a visible region, and a near-infrared region is detected, a silicon photodiode can be used as the light detector 3. The spacers 4 and the Fabry-Perot interference filter 10 are adhered to each other by the die bond resin 5. In addition, the spacers 4 and the Fabry-Perot interference filter 10 form an adhesive portion.

The plurality of spacers 4 are fixed on the wiring substrate 2. The Fabry-Perot interference filter 10 is fixed on the plurality of spacers 4. In this way, the plurality of spacers 4 support the Fabry-Perot interference filter 10. At this time, to suppress an influence of thermal strain on the Fabry-Perot interference filter 10, the plurality of spacers 4 and the Fabry-Perot interference filter 10 are preferably fixed by the die bond resin 5. The die bond resin 5 is made of a flexible resin material. As examples of the resin material configuring the die bond resin 5, various resin materials such as silicone resins, urethane resins, epoxy resins, acrylic resins, or hybrid resins can be used. As the resin material of the die bond resin 5, a material of which elastic modulus (or Young's modulus) is equal to or lower than 0.1 GPa is preferably used. In addition, the resin material is preferably selected from room temperature curing resin materials or low temperature curing resin materials.

In addition, silicon, ceramic, quartz, glass, or plastic can be used as examples of a material of the plurality of spacers 4. Particularly, to alleviate a difference of thermal expansion coefficients with portions contacting the plurality of spacers 4 in the Fabry-Perot interference filter 10, the material of the plurality of spacers 4 is preferably a material of which a thermal expansion coefficient is equal to or smaller than a thermal expansion coefficient of the material of the Fabry-Perot interference filter 10. For example, when the Fabry-Perot interference filter 10 is formed on a silicon substrate, the plurality of spacers 4 are preferably formed of a material having a small thermal expansion coefficient, such as the quartz and the silicon. In addition, instead of a configuration in which the wiring substrate 2 and the spacers 4 are formed separately as described above, a configuration in which portions becoming the spacers 4 are formed integrally on a surface of the wiring substrate 2 may be used.

The light detector 3 faces a light transmission region 11 of the Fabry-Perot interference filter 10 between the wiring substrate 2 and the Fabry-Perot interference filter 10. In addition, the light detector 3 detects light having transmitted the Fabry-Perot interference filter 10. In addition, a temperature sensor such as the thermistor may be disposed on the wiring substrate 2.

As described below, the wiring substrate 2, the light detector 3, the plurality of spacers 4, and the Fabry-Perot interference filter 10 are accommodated in a CAN package. In an accommodation state, the wiring substrate 2 is fixed on a stem and the light transmission region 11 of the Fabry-Perot interference filter 10 faces a light transmission window of a cap. The electrode pads 2b of the wiring substrate 2 are electrically connected to individual lead pins 84 penetrating the stem by wire bonding. In addition, terminals 12 and 13 of the Fabry-Perot interference filter 10 are electrically connected to the individual lead pins penetrating the stem by the wire bonding. An input/output of an electric signal with respect to the light detector 3 is executed via the lead pins, the electrode pads 2b, and the mounting unit 2a. A voltage is applied to the Fabry-Perot interference filter 10 via the lead pins and the terminals 12 and 13.

Hereinafter, an arrangement of the spacers 4 and the die bond resin 5 will be described. The spacers 4 are disposed to have an opening A1 communicating with an inner side and an outer side of a surrounding region (region that does not include the light transmission region 11 and surrounds the light transmission region 11) of the light transmission region 11, when viewed from a light transmission direction in the light transmission region 11 of the Fabry-Perot interference filter 10. In the present specification, if a certain element (for example, the spacers 4 or the die bond resin 5) has an opening, it means that the element has a break in at least one place. In other words, the element does not have an annular shape to surround a certain region (for example, the light transmission region 11) without a gap. A relation of lengths of the element and the opening is not limited in particular. For example, if the spacers 4 are provided in some portion on the circumference of a figure such as a circle and a polygon surrounding the light transmission region 11 and the spacers 4 are not provided in an entire portion, the spacers 4 have the openings A1. To dispose the Fabry-Perot interference filter 10 stably, the spacers 4 are preferably disposed on at least both sides of the light transmission region 11 when viewed from the light transmission direction. As a specific example of the spacers 4 having the opening, the two spacers 4 extending linearly may be disposed in parallel to each other (refer to FIG. 13(A)). As another specific example, the spacers 4 may be disposed in a shape of U (refer to FIG. 20(B)). As another specific example, the columnar spacers 4 may be disposed at four vertexes of a rectangle, respectively (refer to FIG. 21(A)).

In the spectral sensor 1C according to this embodiment, two linear spacers 4A and 4B disposed in parallel to each other are used as the spacers 4. The spacers 4A and 4B have the openings A1 shown by a two-dotted chain line between ends of the same sides in the spacers 4A and 4B. In other words, a rectangle to surround the light transmission region 11 is formed by the spacers 4A and 4B and the two openings A1 and A1. The spacers 4A and 4B are provided at two sides of the rectangle, respectively. In addition, the spacers 4A and 4B are not provided at the remaining two sides. The openings A1 and A1 are formed at the remaining two sides.

In addition, the die bond resin 5 is provided on only a top surface of the spacer 4A in the spacers 4A and 4B. In other words, the die bond resin 5 is not provided on a top surface of the spacer 4B. Therefore, a bottom surface of the Fabry-Perot interference filter 10 is adhered to the top surface of the spacer 4A by the die bond resin 5. However, the bottom surface of the Fabry-Perot interference filter 10 is not adhered to the top surface of the spacer 4B.

Similar to the spacers 4A and 4B, the die bond resin 5 has an opening communicating with the inner side and the outer side of the surrounding region. That is, the die bond resin 5 is disposed linearly over almost an entire length of the spacer 4A, on the top surface of the spacer 4A. A rectangle to surround the light transmission region 11 is formed by the die bond resin 5 and an opening A2 shown by a two-dotted chain line of a shape of U in FIG. 10. The die bond resin 5 is provided at one side of the rectangle. In addition, the die bond resin 5 is not provided at the remaining three sides. The opening A2 is formed at the remaining three sides.

In the spectral sensor 1C configured as described above, if measurement light is incident, light having a predetermined wavelength according to a voltage applied to the Fabry-Perot interference filter 10 transmits the Fabry-Perot interference filter 10. In addition, the light having transmitted the Fabry-Perot interference filter 10 is detected by the light detector 3. In the spectral sensor 1C, the light having transmitted the Fabry-Perot interference filter 10 is detected by the light detector 3 while the voltage applied to the Fabry-Perot interference filter 10 is changed, so that a spectral spectrum can be obtained.

[Fabry-Perot Interference Filter]

Figure 11:
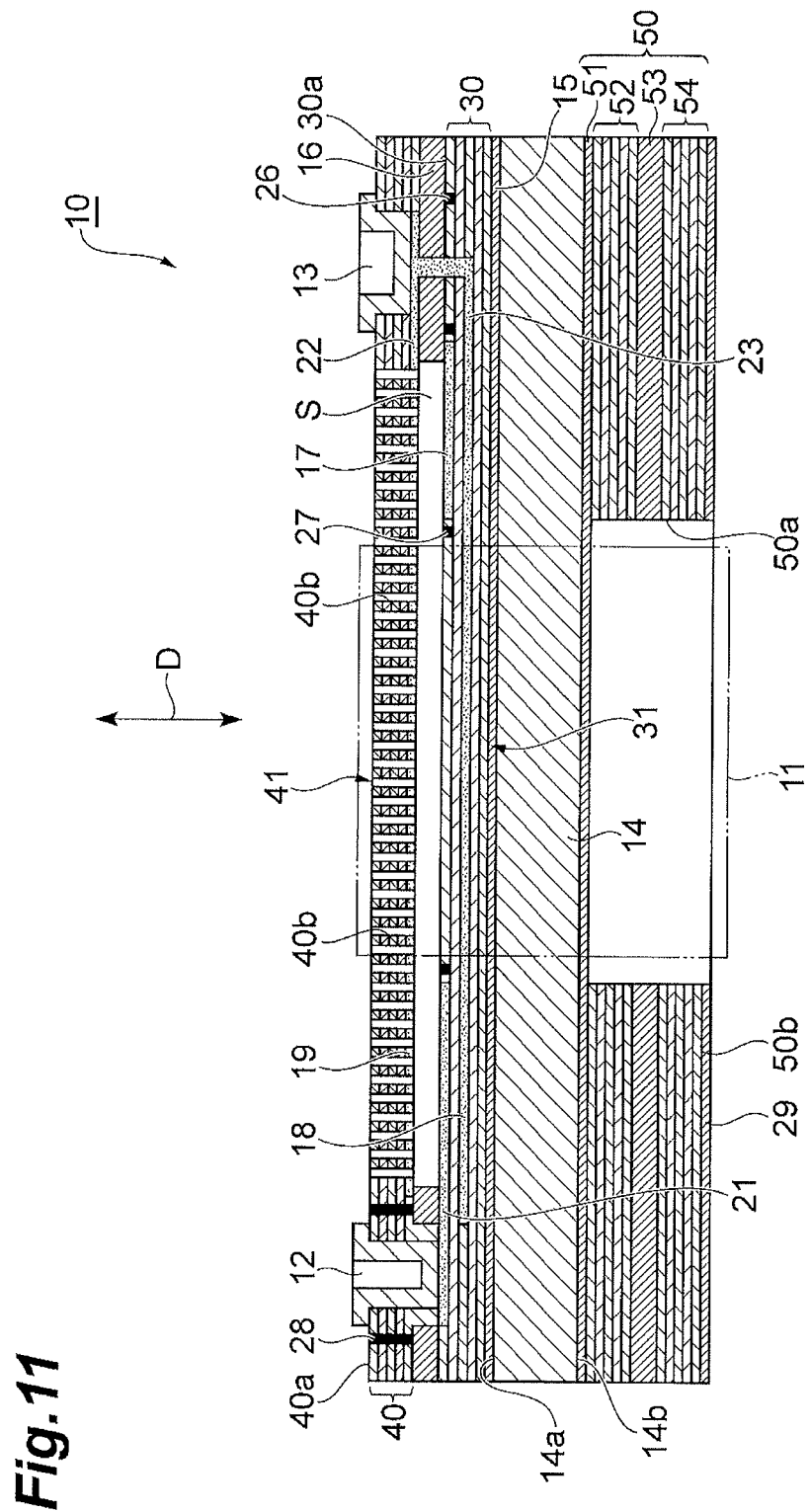
FIG. 11 is a cross-sectional view taken along line XI-XI of a Fabry-Perot interference filter of the light-detecting device according to the third embodiment.

As illustrated in FIG. 11, the Fabry-Perot interference filter 10 includes a substrate 14. A reflection prevention layer 15, a first laminate 30, a sacrificial layer 16, and a second laminate 40 are sequentially stacked on a surface 14a of a light incidence side of the substrate 14. A gap (air gap) S is formed between the first laminate 30 and the second laminate 40 by the sacrificial layer 16 of a frame shape. In the Fabry-Perot interference filter 10, the measurement light is incident on the second laminate 40 from the side opposite to the substrate 14. In addition, the light having the predetermined wavelength transmits the light transmission region 11 defined in a center portion of the Fabry-Perot interference filter 10. In addition, the substrate 14 is made of silicon, quartz, and glass, for example. When the substrate 14 is made of the silicon, the reflection prevention layer 15 and the sacrificial layer 16 are made of silicon oxide, for example. A thickness of the sacrificial layer 16 is 200 nm to 10 μm. The thickness of the sacrificial layer 16 is preferably the integral multiple of ½ of a center transmission wavelength (that is, a wavelength to be a center of a variable range of a transmission wavelength of the Fabry-Perot interference filter 10).

A portion corresponding to the light transmission region 11 in the first laminate 30 functions as a first mirror 31. The first laminate 30 is configured by laminating a plurality of polysilicon layers and a plurality of silicon nitride layers alternately. An optical thickness of each of the polysilicon layer and the silicon nitride layer configuring the first mirror 31 is preferably the integral multiple of ¼ of the center transmission wavelength (center wavelength of the variable wavelength range).

A portion corresponding to the light transmission region 11 in the second laminate 40 functions as a second mirror 41 facing the first mirror 31 with the gap S therebetween. Similar to the first laminate 30, the second laminate 40 is configured by laminating a plurality of polysilicon layers and a plurality of silicon nitride layers alternately. An optical thickness of each of the polysilicon layer and the silicon nitride layer configuring the second mirror 41 is preferably the integral multiple of ¼ of the center transmission wavelength (center wavelength of the variable wavelength range).

In addition, a plurality of through-holes 40b are distributed uniformly in a portion corresponding to the gap S in the second laminate 40. The through-holes 40b extend from the surface 40a of the second laminate 40 to the gap S. The through-holes 40b are formed not to substantially affect a function of the second mirror 41. A diameter of the through-hole 40b is 100 nm to 5 μm, for example. In addition, an opening area of the through-holes 40b occupies 0.01 to 10% of an area of the second mirror 41.

In the Fabry-Perot interference filter 10, the first mirror 31 and the second mirror 41 are supported to the substrate 14. In addition, the first mirror 31 is disposed on a light incidence side of the substrate 14. The second mirror 41 is disposed on a light incidence side of the first mirror 31 with the gap S therebetween.

In the first mirror 31, a first electrode 17 is formed to surround the light transmission region 11. The first electrode 17 is formed by doping impurities into the polysilicon layer and decreasing resistance.

In the first mirror 31, a second electrode 18 is formed to include the light transmission region 11. The second electrode 18 is formed by doping the impurities into the polysilicon layer and decreasing resistance. In the polysilicon layer, a size of the second electrode 18 is preferably a size including an entire region of the light transmission region 11. In addition, a size of the second electrode 18 may be almost equal to a size of the light transmission region 11.

In the second mirror 41, a third electrode 19 is formed. The third electrode 19 faces the first electrode 17 and the second electrode 18. The third electrode 19 is formed by doping the impurities into the polysilicon layer and decreasing resistance.

In the Fabry-Perot interference filter 10, the second electrode 18 is positioned at the side opposite to the third electrode 19 with respect to the first electrode 17, in a facing direction D in which the first mirror 31 and the second mirror 41 face each other. That is, the first electrode 17 and the second electrode 18 are not disposed on the same plane in the first mirror 31. The second electrode 18 is separated from the third electrode 19 more than the first electrode 17.

As illustrated in FIGS. 10 and 11, the terminals 12 apply a voltage to the Fabry-Perot interference filter 10. The pair of terminals 12 is provided to face each other with the light transmission region 11 therebetween. Each terminal 12 is disposed in the through-hole extending from the surface 40a of the second laminate 40 to the first laminate 30. Each terminal 12 is electrically connected to the first electrode 17 via a wiring line 21.

As illustrated in FIGS. 10 and 11, the terminals 13 apply a voltage to the Fabry-Perot interference filter 10. The pair of terminals 13 is provided to face each other with the light transmission region 11 therebetween. A facing direction of the pair of terminals 12 and a facing direction of the pair of terminals 13 are orthogonal to each other. Each terminal 13 is electrically connected to the third electrode 19 via a wiring line 22. In addition, the third electrode 19 is electrically connected to the second electrode 18 via a wiring line 23.

As illustrated in FIG. 11, trenches 26 and 27 are provided are provided in a surface 30a of the first laminate 30. The trench 26 extends annularly to surround the wiring line 23 extending along the facing direction D from the terminal 13. The trench 26 electrically insulates the first electrode 17 and the wiring line 23 from each other. The trench 27 extends annularly along an inner edge of the first electrode 17. The trench 27 electrically insulates the first electrode 17 and an inner region of the first electrode 17 from each other. A region in each of the trenches 26 and 27 may be an insulating material and may be a gap.

A trench 28 is provided in the surface 40a of the second laminate 40. The trench 28 extends annularly to surround the terminal 12. A bottom surface of the trench 28 reaches the sacrificial layer 16. The trench 28 electrically insulates the terminal 12 and the third electrode 19 from each other. A region in the trench 28 may be an insulating material and may be a gap.

A reflection prevention layer 51, a third laminate 52, an intermediate layer 53, and a fourth laminate 54 are sequentially stacked on a surface 14b of a light emission side of the substrate 14. The reflection prevention layer 51 and the intermediate layer 53 have the same configurations as the configurations of the reflection prevention layer 15 and the sacrificial layer 16, respectively. The third laminate 52 and the fourth laminate 54 have lamination structures symmetrical to lamination structures of the first laminate 30 and the second laminate 40, on the basis of the substrate 14. A stress adjustment layer 50 is configured by the reflection prevention layer 51, the third laminate 52, the intermediate layer 53, and the fourth laminate 54. The stress adjustment layer 50 is disposed on the light emission side of the substrate 14 and has a function of suppressing a warp of the substrate 14. An opening 50a is provided in the stress adjustment layer 50 to include the light transmission region 11. A light shielding layer 29 is formed on a surface 50b of the light emission side of the stress adjustment layer 50. The light shielding layer 29 is made of aluminum and has a function of shielding measurement light.

In the Fabry-Perot interference filter 10 configured as described above, if a voltage is applied between the first electrode 17 and the third electrode 19 through the terminals 12 and 13, electrostatic force according to the voltage is generated between the first electrode 17 and the third electrode 19. By the electrostatic force, the second mirror 41 is driven to be attracted to the side of the first mirror 31 fixed on the substrate 14. By the drive, the distance between the first mirror 31 and the second mirror 41 is adjusted. The wavelength of the light transmitting the Fabry-Perot interference filter 10 depends on the distance between the first mirror 31 and the second mirror 41 in the light transmission region 11. Therefore, the wavelength of the transmitting light can be appropriately selected by adjusting the voltage applied between the first electrode 17 and the third electrode 19. At this time, the second electrode 18 has the same potential as the potential of the third electrode 19 electrically connected to the second electrode 18. Therefore, the second electrode 18 functions as a compensation electrode to maintain the first mirror 31 and the second mirror 41 in the light transmission region 11 evenly.

[Process for Manufacturing Spectral Sensor]

Figure 15:
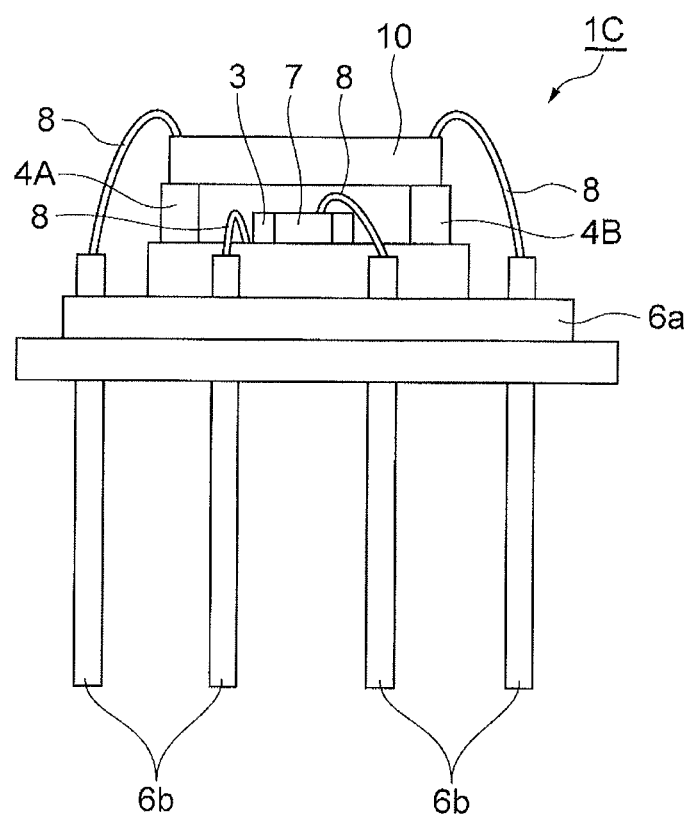
FIG. 15 is a lateral view corresponding to FIG. 14(B).
Figure 16:
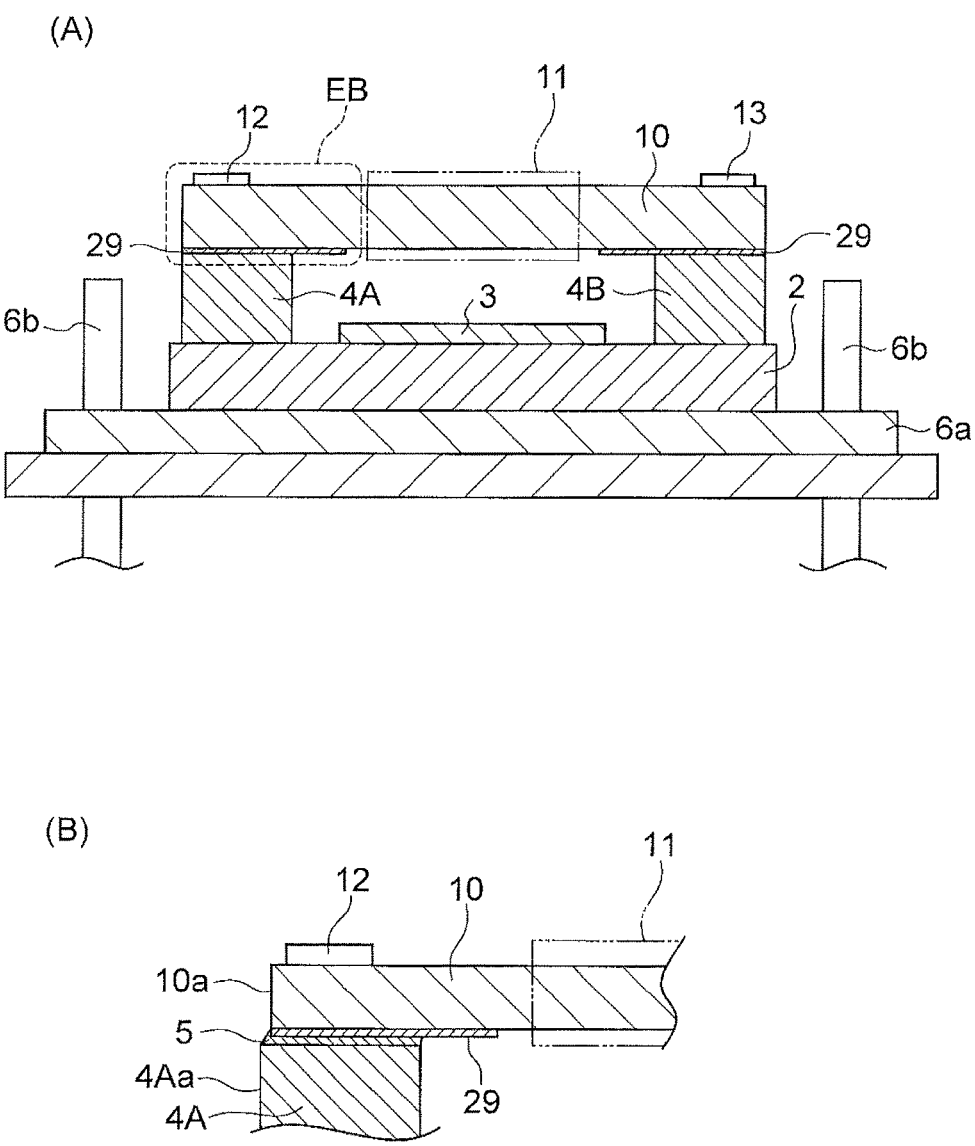
FIG. 16 is a cross-sectional view taken along line XVI-XVI of FIG. 14(B) and an enlarged view of a part thereof.

Next, processes for manufacturing the spectral sensor according to this embodiment will be described with reference to FIGS. 12 to 17. FIGS. 12 to 14 and 17 are plan views illustrating the manufacturing processes. FIG. 15 is a lateral view corresponding to FIG. 14(B). FIG. 16 is a cross-sectional view taken along line XVI-XVI of FIG. 14(B) and an enlarged view of a part thereof. As illustrated in FIG. 12(A), first, a stem 6 is prepared. The stem 6 is a TO-CAN stem, for example. The stem 6 has a configuration in which conductive lead pins 6b penetrate a disk-shaped base 6a.

Next, as illustrated in FIG. 12(B), the wiring substrate 2 is disposed on the base 6a of the stem 6. In addition, the wiring substrate 2 is adhered to the base 6a by a resin. The mounting unit 2a, the plurality of electrode pads 2b, and the mounting unit 2c are disposed on the wiring substrate 2. The light detector 3 is fixed on the mounting unit 2a. A thermistor 7 is disposed on the mounting unit 2c. The mounting units 2a and 2c are electrically connected to the different electrode pads 2b by the wiring lines 2d.

Next, as illustrated in FIG. 13(A), the light detector 3 is disposed on the mounting unit 2a of the wiring substrate 2. In addition, the thermistor 7 is disposed on the mounting unit 2c of the wiring substrate 2. In addition, the spacers 4A and 4B to be two rod-shaped members are disposed on the wiring substrate 2 to extend in parallel to each other. As described above, the spacers 4 are provided to have the two openings A1 and A1, when viewed from a light transmission direction (direction perpendicular to a plane of paper) in the light transmission region 11 of the Fabry-Perot interference filter 10.

The two spacers 4A and 4B are disposed in a surrounding region of the light transmission region 11, when viewed from the light transmission direction in the light transmission region 11 of the Fabry-Perot interference filter 10. That is, the spacers 4A and 4B are disposed to be separated from the light transmission region 11, when viewed from the light transmission direction in the light transmission region 11. In addition, the thermistor 7 may be omitted.

Next, as illustrated in FIG. 13(B), the light detector 3, the thermistor 7, the electrode pads 2b, and the lead pins 6b of the stem 6 are electrically connected by wire bonding using the wire 8. A material of the wire 8 is gold (Au), for example.

Next, as illustrated in FIG. 14(A), the die bond resin 5 is applied to one of the spacers 4. As described above, the die bond resin 5 is provided to have the opening A2, when viewed from the light transmission direction in the light transmission region 11. The die bond resin 5 is applied to be disposed on only one side of the Fabry-Perot interference filter 10, when viewed from the light transmission direction in the light transmission region 11 of the Fabry-Perot interference filter 10. One side of the Fabry-Perot interference filter 10 is the side of a region occupying about ¼ of the entire circumference of a center portion of the Fabry-Perot interference filter 10 in the case in which the Fabry-Perot interference filter 10 is divided radially from the center portion thereof, when viewed from the light transmission direction. One side of the Fabry-Perot interference filter 10 is one side of the Fabry-Perot interference filter 10 when the Fabry-Perot interference filter 10 has a rectangular shape. In the case of an example illustrated in FIG. 14(A), the die bond resin 5 is applied over almost an entire length of a top surface of the spacer 4A. In other words, the die bond resin 5 is not applied to a top surface of the spacer 4B.

Next, as illustrated in FIG. 14(B), the Fabry-Perot interference filter 10 is disposed on the spacers 4. As a result, the Fabry-Perot interference filter 10 is fixed on the spacers 4 by the die bond resin 5 (the Fabry-Perot interference filter 10 is disposed on the light detector 3 to be separated from each other). At this time, the spacers 4 are disposed at positions corresponding to the terminals 12 and 13. The terminals 12 and 13 function as bonding pads of the Fabry-Perot interference filter 10. In addition, the terminals 12 and 13 of the Fabry-Perot interference filter 10 are electrically connected to the lead pins 6b of the stem 6 by the wire 8. The material of the wire 8 is gold (Au), for example.

The lateral view corresponding to FIG. 14(B) is illustrated in FIG. 15. The Fabry-Perot interference filter 10 is adhered to one spacer 4A by the die bond resin 5. Meanwhile, the die bond resin 5 is not applied to the other spacer 4B. Therefore, the Fabry-Perot interference filter 10 is not adhered to the other spacer 4B.

The cross-sectional view taken along line XVI-XVI of FIG. 14 is illustrated in FIG. 16(A). An enlarged view corresponding to a portion surrounded by an ellipse EB in FIG. 16(A) is illustrated in FIG. 16(B).

The spacers 4A and 4B are separated from the light transmission region 11 of the Fabry-Perot interference filter 10. In addition, the spacers 4A and 4B are disposed at the positions corresponding to the terminals 12 and 13 of the Fabry-Perot interference filter 10. Specifically, the spacers 4A and 4B are positioned right below the terminals 12 and 13. The Fabry-Perot interference filter 10 is adhered to the top surface of the spacer 4A, such that the top surfaces of the spacers 4A and 4B and the light shielding layer 29 of the Fabry-Perot interference filter 10 contact each other. In addition, as illustrated in FIG. 16(B), an outside surface 4Aa of the spacer 4A is positioned to be slightly closer to the outside than an outside surface 10a of the Fabry-Perot interference filter 10.

Figure 17:
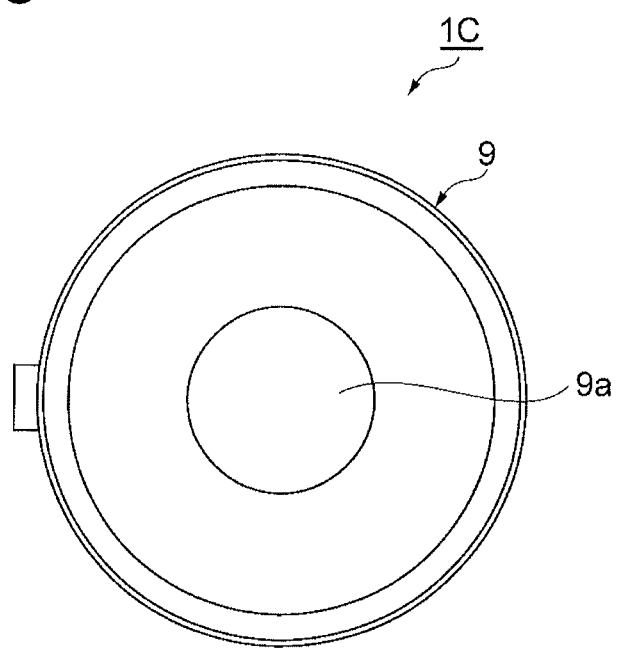
FIG. 17 is a plan view illustrating a process for manufacturing the light-detecting device according to the third embodiment.

A process following FIG. 14(B) is illustrated in FIG. 17. As illustrated in FIG. 17, a cap 9 made of a metal is mounted on the base 6a of the stem 6. By mounting the cap 9, the Fabry-Perot interference filter 10 and the light detector 3 are sealed. The cap 9 is formed to be approximately cylindrical and includes a circular transmission window 9a provided on a top surface thereof. The transmission window 9a may be a transmission window using a material corresponding to an application wavelength range of the spectral sensor 1C. As the material, glass, silicon, and germanium are exemplified.

In addition, the transmission window 9a may be a window to which a reflection prevention film is attached or a bandpass filter to restrict the application wavelength range. The spectral sensor 1C is obtained by the manufacturing processes described with reference to FIGS. 12 to 17.

According to the spectral sensor 1C according to this embodiment, the die bond resin 5 to adhere the Fabry-Perot interference filter 10 and the spacer 4A to each other has the opening A2 communicating with an inner side and an outer side of a surrounding region of the light transmission region 11, when viewed from the light transmission direction in the light transmission region 11. For this reason, in the opening A2, the thermal strain from a peripheral member of the Fabry-Perot interference filter 10 such as the wiring substrate 2 can be suppressed from being transmitted to the Fabry-Perot interference filter 10 via the die bond resin 5. Therefore, a temperature characteristic of the transmission wavelength of the Fabry-Perot interference filter 10 can be suppressed from being deteriorated. In addition, an influence of the thermal strain of the peripheral member of the Fabry-Perot interference filter 10 caused by contraction in hardening of the die bond resin 5 when the Fabry-Perot interference filter 10 is adhered to the top surface of the spacer 4A can be reduced. In addition, an influence of the thermal strain of the peripheral member of the Fabry-Perot interference filter 10 when the die bond resin 5 is a thermosetting resin can be reduced. Therefore, a situation in which the strain occurs in the Fabry-Perot interference filter 10 and the transmission wavelength is shifted can be suppressed from occurring.

In addition, in the spectral sensor 1C, the die bond resin 5 has the opening A2 when viewed from the light transmission direction in the light transmission region 11. For this reason, a sealed space is not formed by the Fabry-Perot interference filter 10, the spacers 4A and 4B, and the die bond resin 5. Therefore, at the time of thermal hardening of the die bond resin 5 in manufacturing the spectral sensor 1C, a situation in which air in a space surrounded by the Fabry-Perot interference filter 10, the spacers 4A and 4B, and the die bond resin 5 thermally expands and breaks the die bond resin 5 does not occur. As a result, a situation in which misalignment of the Fabry-Perot interference filter 10 occurs and an optical characteristic is deteriorated can be suppressed from occurring. In addition, when an element having a membrane structure such as a thermopile is used as the light detector 3, the membrane structure of the light detector 3 can be prevented from being damaged by the thermal expansion of the air.

The spectral sensor 1C further includes the wiring substrate 2 and the light detector 3 and the spacers 4A and 4B are fixed on the wiring substrate 2. For this reason, the thermal strain from the peripheral member of the Fabry-Perot interference filter 10 can be suppressed from being transmitted to the Fabry-Perot interference filter 10 via the spacers 4A and 4B and the die bond resin 5 from the wiring substrate 2.

In addition, in the spectral sensor 1C, an adhesive portion is provided on only one side of the Fabry-Perot interference filter 10, when viewed from the light transmission direction in the light transmission region 11. For this reason, the thermal strain can be suppressed from being transmitted to the Fabry-Perot interference filter 10 via the adhesive portion from the member disposed around the Fabry-Perot interference filter 10, for example, the wiring substrate 2, at the side other than one side of the Fabry-Perot interference filter 10. In addition, the adhesive portion is provided on only one side of the Fabry-Perot interference filter 10. For this reason, the influence of the thermal strain of the peripheral member of the Fabry-Perot interference filter 10 caused by contraction at the time of hardening the die bond resin 5 can be further reduced. In addition, the influence of the thermal strain of the peripheral member of the Fabry-Perot interference filter 10 when the die bond resin 5 is the thermosetting resin can be further reduced. For this reason, the situation in which the strain occurs in the Fabry-Perot interference filter 10 and the transmission wavelength is shifted can be further suppressed from occurring.

In addition, in the spectral sensor 1C, the spacers 4A and 4B have the openings A1 communicating with the inner side and the outer side of the surrounding region of the light transmission region 11, when viewed from the light transmission direction in the light transmission region 11. For this reason, the openings A1 of the spacers 4A and 4B can be used to pass the wire 8 to electrically connect the elements such as the light detector 3. As a result, the electrode pad 2b to electrically connect the elements such as the light detector 3 can be disposed at the position overlapping the Fabry-Perot interference filter 10, when viewed from the light transmission direction in the light transmission region 11. Therefore, the spectral sensor 1C can be miniaturized.

In addition, the Fabry-Perot interference filter 10 has the terminals 12 and 13. The spacers 4A and 4B are disposed at the positions corresponding to the terminals 12 and 13, when viewed from the light transmission direction in the light transmission region 11. For this reason, in a wire bonding process at the time of manufacturing the spectral sensor 1C, the terminals 12 and 13 of the Fabry-Perot interference filter 10 are supported by the spacers 4A and 4B provided at the positions corresponding to the terminals 12 and 13. For this reason, stable wire bonding is enabled. Therefore, wire bonding performance can be improved.

In addition, the spacers 4A and 4B are separated from the light transmission region 11 of the Fabry-Perot interference filter 10, when viewed from the light transmission direction in the light transmission region 11. As a result, the spacer 4A and the light transmission region 11 are separated from each other. Therefore, in manufacturing the spectral sensor 1C, even when the die bond resin 5 protrudes from a portion between the spacer 4A and the Fabry-Perot interference filter 10, the die bond resin 5 can be suppressed from entering the light transmission region 11. Even when the die bond resin 5 is excessively applied, the surplus die bond resin 5 is moved to the lower side of the spacer 4A. Therefore, the die bond resin 5 can be prevented from being moved to the light transmission region 11.

In addition, as illustrated in FIG. 16(B), the outside surface of the spacer 4A is positioned to be slightly closer to the outside than the outside surface of the Fabry-Perot interference filter 10. As a result, a fillet of the die bond resin 5 is formed. Therefore, the adhesion is surely performed.

[Modification]

For the arrangement of the spacers 4 and the die bond resin 5 described with reference to FIG. 14(A), various modifications can be taken. For example, as illustrated in FIG. 18(A), the die bond resins 5 may be applied in a dotted shape. The die bond resins 5 are applied to both ends of the spacer 4A in the top surface of the spacer 4A. In addition, as illustrated in FIG. 18(B), the die bond resin 5 may be applied in a dotted shape. The die bond resins 5 are applied to ends positioned at the same sides of the spacers 4A and 4B. In this case, a portion between the die bond resins 5 of the dotted shape functions as an opening communicating with the inner side and the outer side of the surrounding region of the light transmission region.

In addition, as illustrated in FIG. 19(A), the die bond resin 5 may be applied. The die bond resin 5 is applied over almost the entire length of the spacers 4A and 4B in the top surfaces of both the spacers 4A and 4B. As illustrated in FIG. 19(B), the die bond resins 5 may be applied. The die bond resins 5 are applied in a dotted shape to both ends of each of the spacers 4A and 4B. In addition, as illustrated in FIG. 20(A), the die bond resins 5 may be applied. The die bond resins 5 are applied to two ends positioned at different sides among the ends of the spacers 4A and 4B.

In addition, the shape and the arrangement of the spacers 4 may be changed. For example, as illustrated in FIG. 20(B), a spacer 4C of a shape of U is fixed on the wiring substrate 2. In addition, the die bond resin 5 may be applied over almost the entire length of a top surface of the spacer 4C of the shape of U. In addition, as illustrated in FIG. 21(A), columnar spacers 4D are fixed on four vertexes of the wiring substrate 2 of the rectangular shape, respectively. In addition, the die bond resins 5 may be applied in a dotted shape to top surfaces of the four spacers 4D.

In addition, the spacer 4 may not have the opening A1. That is, the spacer 4 may have an annular shape. For example, as illustrated in FIG. 21(B), a spacer 4E may be disposed on the wiring substrate 2. The spacer 4E has a rectangular shape and does not have an opening. Even in this case, the die bond resin 5 applied to a top surface of the spacer 4E may have an opening. That is, the adhesive portion may have an opening. The adhesive portion is formed by adhering the spacer 4 and the Fabry-Perot interference filter 10 by the die bond resin 5. In an example illustrated in FIG. 21(B), the die bond resin 5 is applied in a shape of U. In the case illustrated in FIG. 21(B), the light detector 3 is connected to an electrode pad 2e disposed in a region surrounded by the spacer 4 by the wire 8. The electrode pad 2e is connected to the electrode pad 2b by the wiring line 2d. Therefore, the light detector 3 is electrically connected to the electrode pad 2b. Here, the wiring line 2d between the electrode pads 2e and 2b is disposed between the top surface of the wiring substrate 2 and the spacer 4. Here, an insulating layer is formed on the top surface of the wiring substrate 2. The insulating layer protects the wiring line 2d, such that the wiring line 2d does not directly contact the spacer 4. In FIGS. 20(B) and 21(B), the thermistor 7, the wire 8 connected to the thermistor 7, and the wiring line 2d are omitted.

In addition, a part of the die bond resin 5 applied to the bottom surface of the Fabry-Perot interference filter 10 may not contribute to adhering the spacer 4 and the Fabry-Perot interference filter 10 to each other. For example, in contrast to the case illustrated in FIG. 21(B), a configuration in which the spacer 4 has an opening and the die bond resin 5 does not have an opening may be used. For example, even though the die bond resin 5 is applied annularly to a peripheral portion of the light transmission region 11 in the bottom surface of the Fabry-Perot interference filter 10, the spacer 4 may have an opening.

Fourth Embodiment

Next, a light-detecting device according to a fourth embodiment will be described. A spectral sensor 1D according to the fourth embodiment is different from the spectral sensor 1C according to the third embodiment in a shape of a package. That is, the spectral sensor 1D is different from the spectral sensor 1C using the stem 6 in that a package thereof is a surface mount device (SMD) package for surface mounting.

Figure 22:
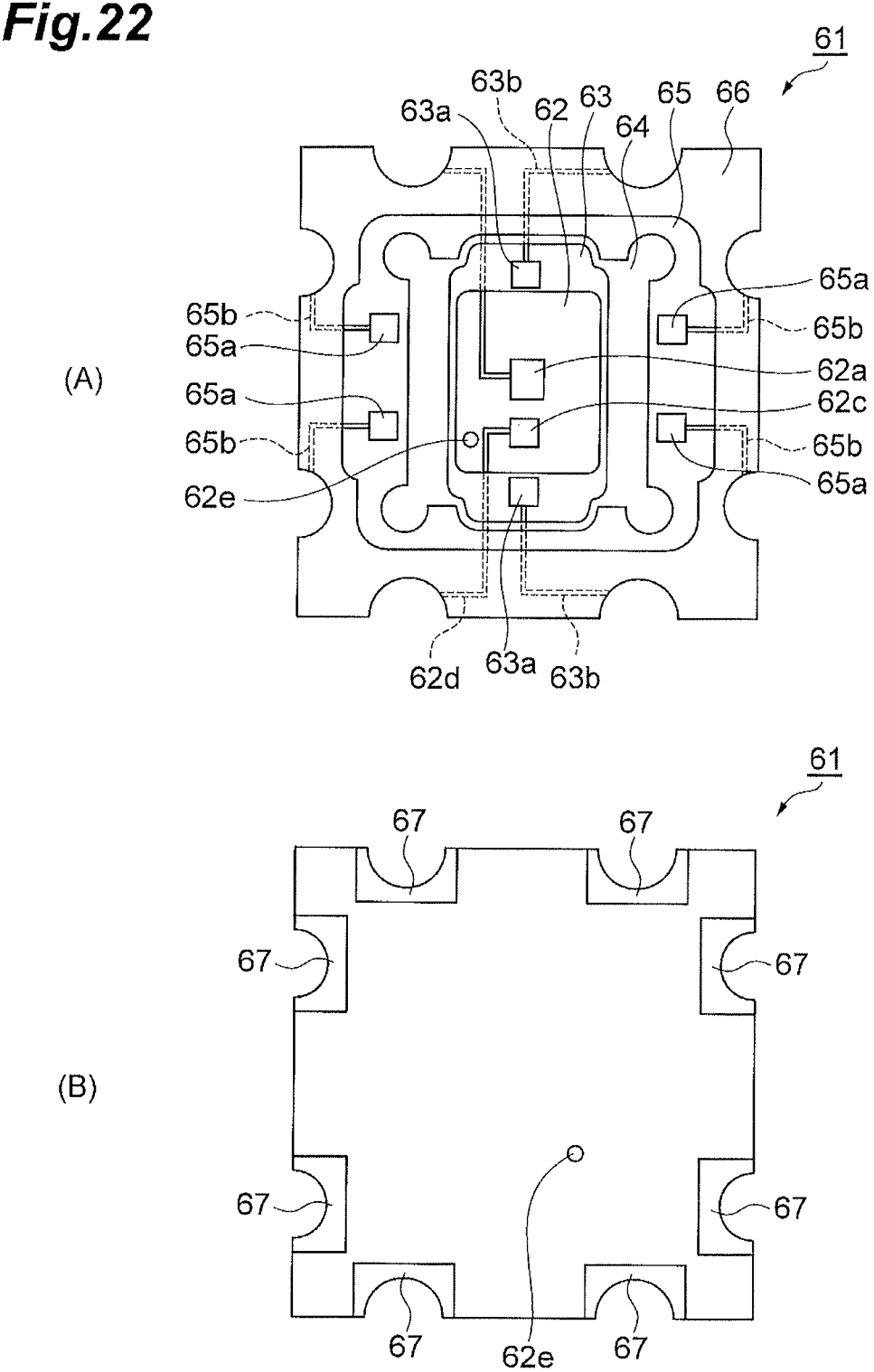
FIG. 22 is a plan view illustrating a process for manufacturing a light-detecting device according to a fourth embodiment.

Hereinafter, processes for manufacturing the spectral sensor 1D will be described. First, an SMD package 61 illustrated in FIG. 22 is prepared. FIG. 22(A) is a plan view of the SMD package 61 and FIG. 22(B) is a bottom view of the SMD package 61. The SMD package 61 has approximately a hollow rectangular parallelepiped shape. The SMD package 61 is formed by sequentially stacking a first layer substrate 62, a second layer substrate 63, a third layer substrate 64, a fourth layer substrate 65, and a fifth layer substrate 66, which have a rectangular shape. As examples of a material of the first layer substrate 62, the second layer substrate 63, the third layer substrate 64, the fourth layer substrate 65, and the fifth layer substrate 66, ceramic or a resin can be used. The first layer substrate 62, the second layer substrate 63, the third layer substrate 64, the fourth layer substrate 65, and the fifth layer substrate 66 may be stacked after being formed separately and may be formed integrally.

Outer circumferential surfaces (lateral surfaces) of the first layer substrate 62, the second layer substrate 63, the third layer substrate 64, the fourth layer substrate 65, and the fifth layer substrate 66 are approximately flush with each other in a stack state. An opening of the rectangular shape is provided in a center portion of each of the second layer substrate 63, the third layer substrate 64, the fourth layer substrate 65, and the fifth layer substrate 66. The opening of the third layer substrate 64 is larger than the opening of the second layer substrate 63. The opening of the fourth layer substrate 65 is larger than the opening of the third layer substrate 64. The opening of the fifth layer substrate 66 is larger than the opening of the fourth layer substrate 65. By this configuration, in a state in which the first layer substrate 62, the second layer substrate 63, the third layer substrate 64, the fourth layer substrate 65, and the fifth layer substrate 66 are stacked, parts of top surfaces of the first layer substrate 62, the second layer substrate 63, the third layer substrate 64, and the fourth layer substrate 65 are exposed from the opening of the fifth layer substrate 66.

Bonding pads and wiring lines are disposed on the exposed top surfaces of the first layer substrate 62, the second layer substrate 63, and the fourth layer substrate 65. In an example illustrated in FIG. 22(A), a mounting unit 62a and a mounting unit 62c are disposed on the top surface of the first layer substrate 62. The mounting unit 62a is used to fix a light detector 3. The mounting unit 62c is used to dispose a thermistor 7. The mounting units 62a and 62c are electrically connected to different electrode pads 67 by wiring lines 62d. The wiring lines 62d are disposed to pass a portion between the first layer substrate 62 and the second layer substrate 63.

Two bonding pads 63a and wiring lines 63b connected to the bonding pads 63a are disposed on the top surface of the second layer substrate 63. The bonding pads 63a are electrically connected to the different electrode pads 67 by the wiring lines 63b. The wiring lines 63b are disposed to pass a portion between the second layer substrate 63 and the third layer substrate 64.

Four bonding pads 65a and wiring lines 65b connected to the bonding pads 65a are disposed on the top surface of the fourth layer substrate 65. The bonding pads 65a are electrically connected to the different electrode pads 67 by the wiring lines 65b. The wiring lines 65b are disposed to pass a portion between the fourth layer substrate 65 and the fifth layer substrate 66.

A through-hole 62e is provided in the first layer substrate 62. The through-hole 62e functions as a ventilation hole to release thermally expanded air, when the spectral sensor 1D is manufactured.

As illustrated in FIG. 22(B), the two electrode pads 67 are provided at each side of a bottom surface of the SMD package 61. The arrangement of the electrode pads 67 is not limited to a form illustrated in FIG. 22(B) and may be appropriately changed according to a function required for the spectral sensor 1D.

Figure 23:
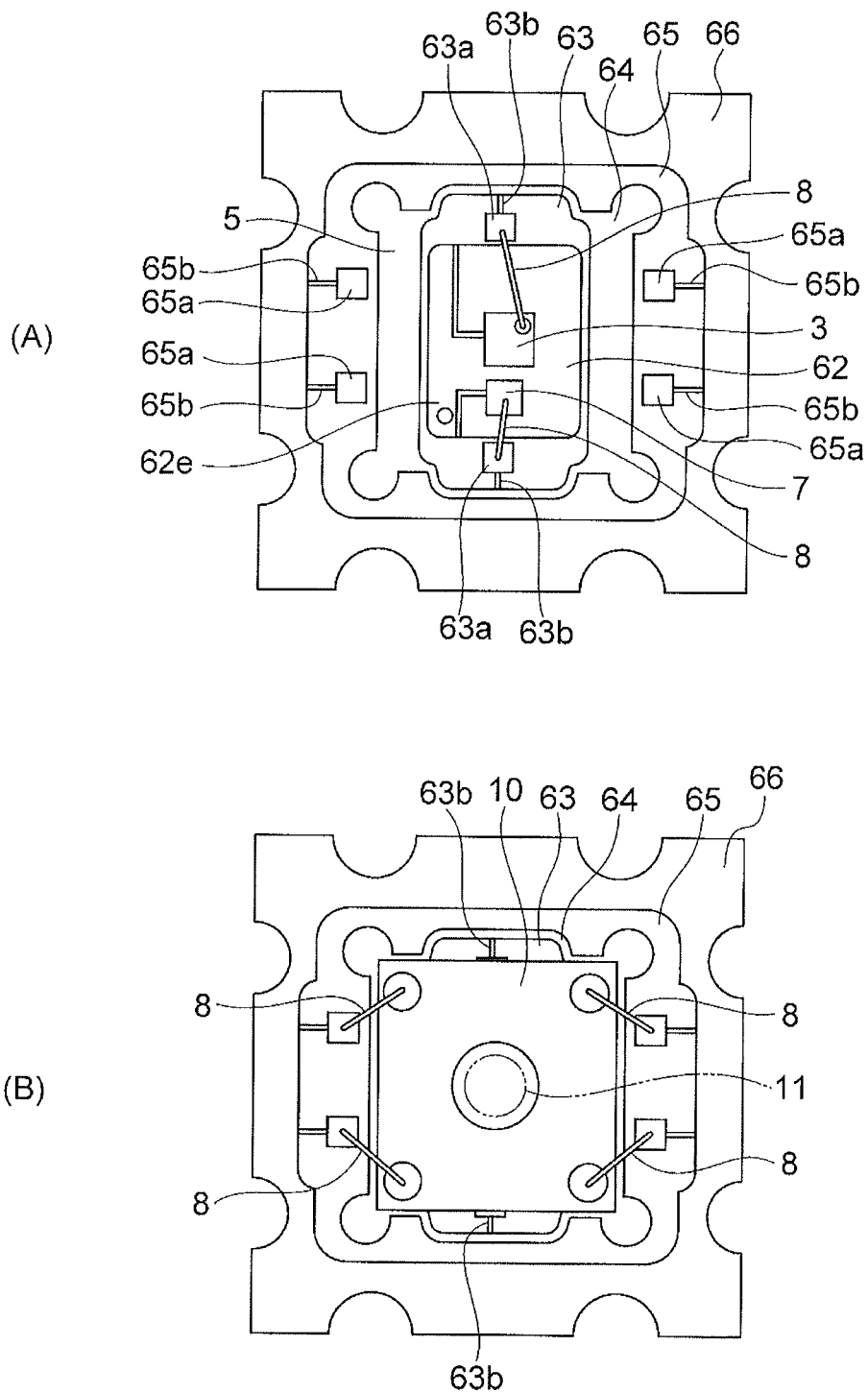
FIG. 23 is a plan view illustrating a process for manufacturing the light-detecting device according to the fourth embodiment.

After the SMD package 61 is prepared, as illustrated in FIG. 23(A), the light detector 3 is mounted on the mounting unit 62a. In addition, the thermistor 7 is mounted on the mounting unit 62c. In addition, the light detector 3 and the bonding pad 63a are connected by wire bonding using the wire 8. In addition, the thermistor 7 and the bonding pad 63a are connected by the wire bonding using the wire 8. In addition, a die bond resin 5 is applied linearly to a portion along one side of the opening of the third layer substrate 64 on the top surface of the third layer substrate 64. Therefore, even in the spectral sensor 1D according to the fourth embodiment, the die bond resin 5 is disposed to have an opening.

Next, as illustrated in FIG. 23(B), a Fabry-Perot interference filter 10 is fixed on the top surface of the third layer substrate 64. As a result, the third layer substrate 64 functions as a support member to support the Fabry-Perot interference filter 10 in a surrounding region of a light transmission region 11. At this time, the die bond resin 5 forms an adhesive portion to adhere the third layer substrate 64 and the Fabry-Perot interference filter 10 to each other. The Fabry-Perot interference filter 10 is disposed such that terminals 12 and 13 thereof are positioned at an edge portion of the opening of the third layer substrate 64.

In addition, the terminals 12 and 13 of the Fabry-Perot interference filter 10 are connected to the bonding pads 65a by the wire bonding using the wire 8.

Finally, as illustrated in FIGS. 24(A) and 24(B), a transmission window 68 is fixed on the fifth layer substrate 66. FIG. 24(A) is a plan view of the spectral sensor 1D obtained by the manufacturing processes described above and FIG. 24(B) is a cross-sectional view taken along line B-B of FIG. 24(A). The transmission window 68 may be a transmission window using a material corresponding to an application wavelength range of the spectral sensor 1D. As the material, glass, silicon, and germanium are exemplified. In addition, the transmission window 68 may be a window to which a reflection prevention film is attached or a band-pass filter to restrict the application wavelength range.

The arrangement of the applied die bond resin 5 is not limited to a form illustrated in FIG. 23(A) and various modifications may be taken. For example, as illustrated in FIG. 25(A), the die bond resin 5 may be applied. The die bond resin 5 is applied in a shape of U along three sides of a peripheral portion of the opening of the third layer substrate 64. In this case, a portion along the remaining one side of the peripheral portion of the opening of the third layer substrate 64 functions as an opening.

For the transmission window 68, a transmission window 68A provided with a film 68C may be used as illustrated in FIG. 25(B). The film 68C does not transmit light to a portion other than a light transmission region 68B. In this case, stray light can be reduced. As the film 68C, a film having a light shielding function or a film having a light absorption function can be used.

The preferred embodiments of the present invention have been described. However, the present invention is not limited to the embodiments. For example, in the spectral sensor 1C according to the third embodiment, the spacer 4 may be fixed on the light detector 3, not the wiring substrate 2. In this case, thermal strain from a peripheral member of the Fabry-Perot interference filter 10 can be suppressed from being transmitted to the Fabry-Perot interference filter via the light detector 3 and the die bond resin 5 from the wiring substrate 2.

In the embodiments, as illustrated in FIG. 11, the light transmission region 11 is the region narrower than the opening 50a. However, the present invention is not limited to the above form. When light with a width narrowed previously is introduced as incidence light, as illustrated in FIG. 11, the light transmission region 11 becomes narrower than the opening 50a. However, when light with a width larger than a width of the opening 50a is introduced as the incidence light, the opening 50a defines the light transmission region 11. The present invention can be applied to such a form.

INDUSTRIAL APPLICABILITY

According to the present invention, a light-detecting device that can realize improvement of wavelength resolution, suppression of wavelength shift, and improvement of a spectral characteristic can be provided.

REFERENCE SIGNS LIST 1A, 1B, 1C, 1D: spectral sensor (light-detecting device), 2: wiring substrate, 3: light detector, 3a: light reception unit, 4: spacer (support member), 10: Fabry-Perot interference filter, 31: first mirror, 41: second mirror, 50a: opening, 61: SMD package (package), 62: first layer substrate (wiring substrate), 63: second layer substrate (wiring substrate), 64: third layer substrate (support member), 69c: light passage hole (light incidence unit), 71: temperature compensation element (mounting component) 81: CAN package (package), 83a: light transmission window (light incidence unit), D: facing direction (predetermined direction), S1: first space, S2: second space

The invention claimed is:

1. A light-detecting device comprising:
a Fabry-Perot interference filter having a first mirror and a second mirror and is provided with an opening to pass light transmitted according to a distance between the first mirror and the second mirror along a predetermined direction, the distance between the first mirror and the second mirror being variable;
a light detector having a light reception unit to receive the light having passed through the opening;
a wiring substrate, the light detector being mounted on the wiring substrate; and
a support member supporting the Fabry-Perot interference filter on the wiring substrate, such that a second space is formed between the Fabry-Perot interference filter and the wiring substrate, the second space being continuous with a first space in the opening and including the first space when viewed from the predetermined direction,
wherein the light detector is disposed in the second space, and
the light reception unit is disposed in a region corresponding to the first space in the second space, when viewed from the predetermined direction,
the opening is defined by at least one face extending from a surface on a light-emitting side toward an inside of the Fabry-Perot interference filter,
the second space is a space in which a surface of the wiring substrate and the Fabry-Perot interference filter face each other in the predetermined direction, the light detector being mounted on the surface of the wiring substrate,
an outer edge of the wiring substrate surrounds the opening of the Fabry-Perot interference filter, when viewed from the predetermined direction,
the Fabry-Perot interference filter further has a frame-shaped layer disposed between the first mirror and the second mirror and forming an air gap therebetween, and
the support member is spaced apart from the opening of the Fabry-Perot interference filter and has a part overlapping with the frame-shaped layer, when viewed from the predetermined direction.

2. The light-detecting device according to claim 1, wherein the light detector is disposed in the region corresponding to the first space in the second space, when viewed from the predetermined direction.

3. The light-detecting device according to claim 1, further comprising:
a mounting component mounted on the wiring substrate in the second space,
wherein the mounting component is disposed outside the region corresponding to the first space in the second space, when viewed from the predetermined direction.

4. The light-detecting device according to claim 1, further comprising:
a package accommodating the Fabry-Perot interference filter, the light detector, the wiring substrate, and the support member and having a light incidence unit to let light incident on the Fabry-Perot interference filter from the outside,
wherein the light incidence unit is included in the Fabry-Perot interference filter when viewed from the predetermined direction.

5. The light-detecting device according to claim 1, wherein
an inner edge of the frame-shaped layer is disposed between an inner edge of the support member and an edge of the opening, when viewed from the predetermined direction.

6. The light-detecting device according to claim 1, further comprising:
a terminal provided on a face opposite the support member in the Fabry-Perot interference filter, and the terminal has a part overlapping with the frame-shaped layer and the support member, when viewed from the predetermined direction.

7. The light-detecting device according to claim 6, further comprising:
a wire electrically connected to the terminal, and a connection part of the wire and the terminal overlaps with the frame-shaped layer and the support member, when viewed from the predetermined direction.

* * * * *